United States Patent [19]
Murata

[11] Patent Number: 5,471,322
[45] Date of Patent: Nov. 28, 1995

[54] RECORDING APPARATUS WITH REDUCED MEMORY CAPACITY REQUIREMENT

[75] Inventor: Daisuke Murata, Yokohama, Japan

[73] Assignee: Canon Kabushiki Kaisha, Tokyo, Japan

[21] Appl. No.: 383,687

[22] Filed: Feb. 1, 1995

Related U.S. Application Data

[63] Continuation of Ser. No. 282,174, Jul. 29, 1994, abandoned, which is a continuation of Ser. No. 611,539, Nov. 13, 1990, abandoned.

[30] Foreign Application Priority Data

Nov. 14, 1989 [JP] Japan .................................. 1-296785
Feb. 20, 1990 [JP] Japan .................................. 2-037447

[51] Int. Cl.⁶ .............................. H04N 1/21; H04N 1/23; H04N 1/50; H04N 1/64
[52] U.S. Cl. .................. 358/502; 358/524; 358/404; 358/444; 358/296; 395/115; 395/116; 347/3
[58] Field of Search .................................. 358/444, 404, 358/468, 401, 296, 450, 453, 439, 524, 502; 347/3; 395/115, 116

[56] References Cited

U.S. PATENT DOCUMENTS

| | | |
|---|---|---|
| 4,580,133 | 4/1986 | Matsuoka et al. . |
| 4,695,898 | 9/1987 | Ishikawa .................................. 358/296 |
| 4,712,139 | 12/1987 | Kato .......................................... 358/439 |
| 4,811,242 | 3/1989 | Adachi ...................................... 395/116 |
| 4,958,236 | 9/1990 | Nagashima .............................. 358/296 |
| 4,967,204 | 10/1990 | Terasawa et al. . |

FOREIGN PATENT DOCUMENTS 283157  9/1988  European Pat. Off. .

*Primary Examiner*—Scott A. Rogers
*Attorney, Agent, or Firm*—Fitzpatrick, Cella, Harper & Scinto

[57] ABSTRACT

A recording apparatus for receiving a page description language representing image data to be recorded and for recording an image includes a memory for storing bit image data smaller than a one-page capacity, a recording unit for recording the bit image data stored in the memory, a unit for generating partial bit image data of an area corresponding to the memory on the basis of the input page description language, and a controller for storing the partial bit image data generated by the generating unit in the memory, and for causing the recording unit to repeat recording of the partial bit image data stored in the memory until one page of bit image data has been recorded.

127 Claims, 20 Drawing Sheets n=4 n = 4

RECORDING APPARATUS WITH REDUCED MEMORY CAPACITY REQUIREMENT

This application is a continuation of application Ser. No. 08/282,174 filed Jul. 29, 1994, which is a continuation of application Ser. No. 07/611,539 filed Nov. 13, 1990, both now abandoned.

BACKGROUND OF THE INVENTION

1. Field of the Invention

The present invention relates to a recording apparatus for applying a recording liquid (e.g., a toner) (to be referred to as an ink hereinafter) on a recording medium such as recording paper to record an image or the like.

2. Related Background Art

In recent years, along with the development of data processing systems, printers when used as peripheral devices of these data processing systems must satisfy requirements for high print quality and low cost. A serial printer as a recording apparatus which satisfies these requirements has been used in practice.

A recording apparatus of this type is generally used in a printer, a facsimile system, a copying machine, or the like. The recording apparatuses are classified into (1) a serial type apparatus for recording information or data one by one while a recording head is moved in a predetermined direction (to be referred to as a main scanning direction hereinafter), and (2) a line type apparatus having a recording head with recording elements corresponding to one recording line arranged in the main scanning direction, so that recording is performed line by line. In such a recording apparatus, every time line recording is completed, the recording medium is fed by a predetermined amount in a direction having a predetermined relationship with the main scanning direction, i.e., a direction perpendicular to the main scanning direction (to be referred to as a subscanning direction hereinafter). When one-page recording is completed, the recorded medium is discharged.

As a recording system for applying an ink to a recording medium, ink-jet, heat transfer, and wire dot systems are available. Among these systems, the ink-jet system has received a great deal of attention because it can perform high-speed recording with relatively high precision. The ink-jet system further includes (1) and (2) respectively systems utilizing heat energy and (1) and (2) respectively systems utilizing an air flow.

A page printer having an image memory having a capacity of at least one page is also commercially available. The page printer can form an image as a bit image in the image memory as in formation of an image on a display device and can record the formed image. A page description language (instructions) such as a post script for a page printer has been developed. When the page description language is used, its instruction (to be referred to as coded data hereinafter) is supplied to the page printer. The page printer generates an image as a bit image in the image memory on the basis of the coded data.

FIG. 10 is a block diagram showing an arrangement for outputting external coded data onto recording paper. This arrangement includes a central processing unit (CPU) 21 for controlling the overall operation of the recording apparatus and performing image development (to be described later), print drivers 23, 24, 25, and 26, a control switch 22, and print heads 27, 28, 29, and 30. Coded data consisting of instructions of the page description language are input to and temporarily stored in a buffer 31. The CPU 21 performs processing for developing the coded data stored in the buffer 31 into image data of a one-page bit image in an image memory 32 and sends output control data to the control switch 22. Upon reception of this data, the control switch 22 determines (selects) a specific one of print drivers and an image data output destination in accordance with the output image data. The started print driver receives the image data from the CPU 21.and outputs the data to the corresponding print head. The print heads eject yellow, magenta, cyan, and black inks, and a full-color image is recorded.

An actual image output operation will be described below.

FIG. 11 is a view showing a sample image developed in the image memory. This sample image has an image start point 1 and an image end point 2. The image developed on the bit map is scanned bit by bit in the main scanning direction indicated by arrow 3. When scanning reaches to the right end, the image is scanned by one dot in the subscanning direction indicated by arrow 4.

The above operation will be described with reference to a flow chart in FIG. 12. When an image output instruction in the form of the page description language is received from a host computer, the printer temporarily stores the instructions in the buffer 31 (step S1). A memory area for storing a developed image is reset (step S2), and image development using an interpreter is started (step S3). At the same time, this data is written in the image memory 32 (step S4), and data development is repeated (step S5), being performed four times, until development and write access of yellow, magenta, cyan, and black data have been completed. When the image development is completed (step S6), the image data in the image memory 32 are read out by the CPU 21 and are output to the respective print drivers 23 to 26, thereby completing a series of operations.

In order the maximize the printer performance as in the conventional case, when one-page image data is stored in the image memory 32 and a multi-color printer is arranged, a total of four pages must be stored in the memories. In addition, if an image has gradation, the memory capacity becomes a serious problem. Since RAMs are expensive, the total cost of the electronic products depends on the number of RAMs mounted on a circuit board. In addition, if a large number of RAMs are used, they occupy a large space within the printer. Therefore, a large number of RAMs cannot be used for low-end compact printers.

In recent years, along with the development of data processing systems, high-speed operations and high print quality, and low cost are required for printers serving as peripheral devices for these data processing systems. As a printing device which satisfies the above requirements, an electrophotographic printer using a laser has been commercially available.

A desk-top publishing system (DTP) which has recently been popular must cope with full-color requirements. Strong demand has arisen for multi-color printers compatible with full-color desk-top publishing systems. Under these circumstances, printers compatible with multi-color requirements have already been used in practical applications. Conventional electrophotographic printers use a laser, an LED, and a liquid crystal shutter as their exposure devices. An LED head and a liquid crystal shutter are becoming popular in these printers due to requirements for low cost and compactness.

FIG. 13 is a perspective view showing a structure near the exposure and developing devices in a conventional multi-color printer using a laser, LED, or liquid crystal shutter.

Recording paper 351 is fed in a direction indicated by an arrow below paper 351 in FIG. 13. The printer includes a photosensitive belt 352, drive rollers 353 for driving the photosensitive belt 352, a transfer belt 354 for transferring an image formed on the photosensitive belt 352 to the recording paper 351, developing devices 355, 356, 357, and 358 for developing basic colors, and an LED or liquid crystal shutter type exposure device 359 commonly corresponding to the developing devices 355, 356, 357, and 358. The photosensitive and exposure processes are performed in the order yellow, magenta, cyan, and black.

The electrophotographic processes in the multi-color printer will be described with reference to FIG. 13.

An exposure image obtained by the exposure device 359 such as a laser, LED, or liquid crystal shutter is exposed on the photosensitive belt 352. A first electrostatic latent image formed by this exposure is developed by the developing device 358. Assume that the colors to be processed by the developing units 355, 356, 357, and 358 are black, cyan, magenta, and yellow, respectively. The first latent image is developed in yellow. When one-page development by the developing device 358 is completed, the image formed on the photosensitive belt 352 is transferred to the transfer belt 354. Any extra developing agent is removed from the photosensitive belt 352 by a cleaner (not shown), and the photosensitive belt 352 is charged again by a charger (not shown). The photosensitive belt 352 charged again upon one revolution is subjected to formation of a second latent image as an exposure operation for a magenta image in the next developing process. This process is substantially the same as that in development with yellow. The developed image is transferred to the transfer belt 354. Cyan and black images are sequentially formed on the transfer belt 354 by the same process as described above, the order named. When all the images are formed on the transfer belt 354, the recording paper 351 comes close to the transfer belt 354, and the multi-color image is recorded on the recording paper 351. The arrows in FIG. 13 are conveyance directions of the recording paper 351, the transfer belt 354, and the photosensitive belt 352. Such developing processes performed in units of colors as in a series of transfer operations are called a multi-path system. This system requires a simple mechanism. However, an output time per sheet is undesirably prolonged.

FIG. 14 shows exposure devices corresponding to the developing devices in the structure shown in FIG. 13. Components 351 to 358 in FIG. 14 are the same as those in FIG. 13, and a detailed description thereof will be omitted. Exposure devices 360 to 363 correspond to the developing devices 355 to 358, respectively. The photosensitive belt 352 is charged by a charger (not shown), and exposure is started from the front exposure device. In the case of FIG. 13, the developing devices are arranged in an order of yellow, magenta, cyan, and black from the front side of the rotational direction. Therefore, the developing agents are applied to the transfer belt 354 in the above order.

FIG. 15 is a block diagram showing an operation wherein external input image data are output onto recording paper. This arrangement includes a central processing unit (CPU) 371 for controlling a recording apparatus body and input data, exposure drivers 373, 374, 375, and 376, a control switch 372 for controlling the above drivers, and exposure devices 377, 378, 379, and 380. The CPU 371 receives the input data and sends output control data to the control switch 372. When the control switch 372 receives the output control data from the CPU 371, the control switch 372 determines a specific one of the exposure drivers in accordance with image data to be output, thereby determining an image data output destination. The started one of the exposure drivers 373 to 376 receives the image data from the CPU 371 and outputs data to a corresponding one of the exposure devices 377 to 380.

FIG. 16 is a view showing a sample developed in an image memory. Positions indicated by arrows ① and ② are image start and end points, respectively. The image developed in the bit map is scanned dot by dot in the main scanning direction indicated by an arrow ③. When scanning reaches to the right end dot, the image is scanned by one dot in the subscanning direction indicated by an arrow ④.

The above operation will be described with reference to a flow chart in FIG. 12. When an image output instruction in the form of a page description language is sent from a host computer (not shown) to the printer, the printer causes a language storage buffer (not shown) to temporarily store this description language (step S1), resets a memory area in which a developed image is written (step S2), and starts image development by an interpreter (step S3). Data is written in the image memory simultaneously with this development (step S4). Data development is repeated until the end of the data (step S5). In a multi-color printer, data development and write access are repeated four times, i.e., in the order yellow, magenta, cyan, and black. When image development is completely performed, the written image data is output (step S6), thereby completing the series of operations.

In order to maximize the printer performance as in the conventional case, when one-page image data is stored in the image memory and a multi-color printer is arranged, a total of four pages must be stored in the memories Since RAMs (random access memory) are expensive, the total cost of the electronic products depends on the number of RAMs mounted on a circuit board. In addition, if a large number of RAMs are used, they occupy a large space within the printer. Therefore, a large number of RAMs cannot be used for low-end compact printers.

SUMMARY OF THE INVENTION

In consideration of the above situation, it is an object of the present invention to output one-page bit image data represented by a page description language by using a memory capable of storing an amount of bit image data smaller than the one-page bit image data to be output.

In consideration of the above situation, it is another object of the present invention to provide a recording apparatus capable of determining whether a large-capacity external memory is connected to the recording apparatus, sequentially storing images to be developed into split memories in the large-capacity external memory if the large-capacity memory is connected to the recording apparatus, and controlling so that one-page bit map data can be stored.

In consideration of the above situation, it is still another object of the present invention to provide a recording apparatus capable of protecting a head during recording when data represented by a page description language is output through a memory capable of storing bit image data smaller than one-page bit image data.

DETAILED DESCRIPTION OF THE PREFERRED EMBODIMENTS

The preferred embodiments according to the present invention will be described in detail with reference to the accompanying drawings. The present invention incorporates an apparatus consisting of a single unit or a plurality of units, or a system for realizing the function of the present invention by supplying programs to an apparatus or system.

[First Embodiment]

Figure 2:
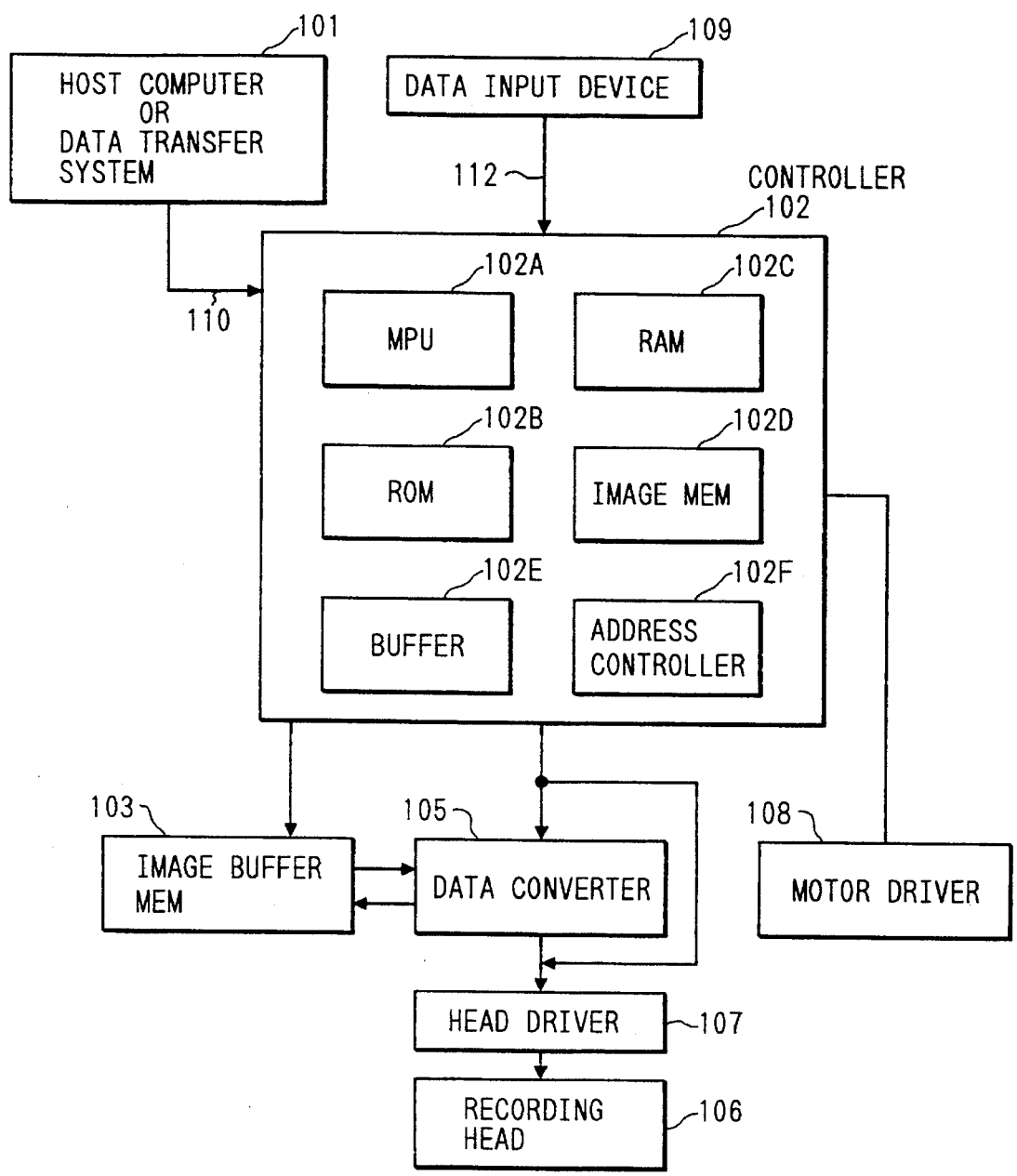
FIG. 2 is a block diagram showing an arrangement of the printer according to the first embodiment of the present invention.

FIG. 2 is a block diagram showing an arrangement of an ink-jet printer according to the first embodiment of the present invention.

The ink-jet printer comprises a host computer or data transfer system 101 for transferring coded data such as a page description language page by page. The coded data from the host computer or data transfer system 101 to the recording apparatus is transferred to a buffer 102E in a controller 102 (to be described later) in the recording apparatus.

The controller 102 controls the overall operation of the ink-jet recording apparatus. The controller 102 comprises an MPU 102A such as a microprocessor, a ROM 102B for storing data such as a control program and a control sequence for the MPU 102A, a random access memory (RAM) 102C used as a work area, an image memory 102D, having a 1/n-page bit image data capacity, for storing bit image data obtained by development processing in the MPU 102A, and an address controller 102F for updating and setting an address value of the image memory 102D (this addressing will be described later).

An image buffer memory 103 in the ink-jet recording apparatus receives image data transferred from the image memory 102D in the controller 102 and stores data, the number of which corresponds to one scanning cycle of at least a recording head, i.e., 128 ejection openings of a recording head. The recording data transferred to the image buffer memory 103 are sequentially stored under the control of the controller 102.

A data converter 105 in the ink-jet recording apparatus sequentially reads out 128 data corresponding to the injection openings aligned in the subscanning direction of a recording head 106 and sequentially outputs the data in accordance with the recording position of the recording head 106. That is, the recording head 106 in this embodiment has the 128 ejection openings aligned in the subscanning direction and ejection energy generation elements corresponding to the 128 ejection openings. Each ejection energy generation element of this embodiment is an electrothermal conversion element for forming a bubble in an ink by the generated heat energy to eject an ink droplet from the corresponding ejection opening in accordance with a change in state of the ink.

A head driver 107 in FIG. 2 selectively drives electrothermal conversion elements of the recording head 106 on the basis of the recording data from the data converter 105.

A motor driver 108 includes a carriage motor for driving a carriage having the recording head 106 thereon in the main scanning direction, a carriage motor driver for driving the carriage motor on the basis of data from the controller 102, a paper feed motor and a paper feed motor driver for feeding paper in corresponding to the pitch of the ejection openings of the recording head 106, and a cassette feeder motor and cassette feeder motor driver. In this embodiment, the carriage motor, the paper feed motor, and the cassette feeder motor comprise stepping motors, respectively.

A data input device 109 is connected to the controller 102 to input various data to the controller 102. The input data is output from the data input device 109 to the controller 102 as a detection signal 112. The data input device 109 includes a key panel for designating a paper size, and a paper end sensor for determining a leading end of a recording medium (to be referred to recording paper or sheet hereinafter) and to detect a trailing end of the sheet. A command signal 110 is sent from the host computer 101 to the controller 102 to designate a recording paper size and the like designated by the host computer 101. Therefore, the paper size and the like can also be designated not only by the data input device 109 but also by the host computer 101.

Figure 3:
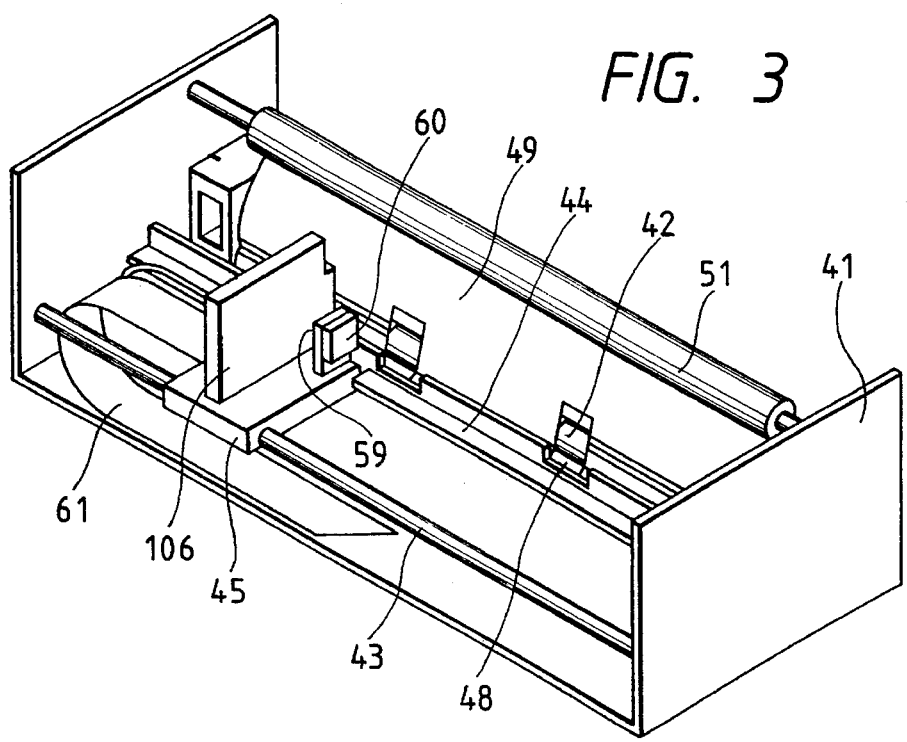
FIG. 3 is a perspective view showing the printer according to the first embodiment.
Figure 4:
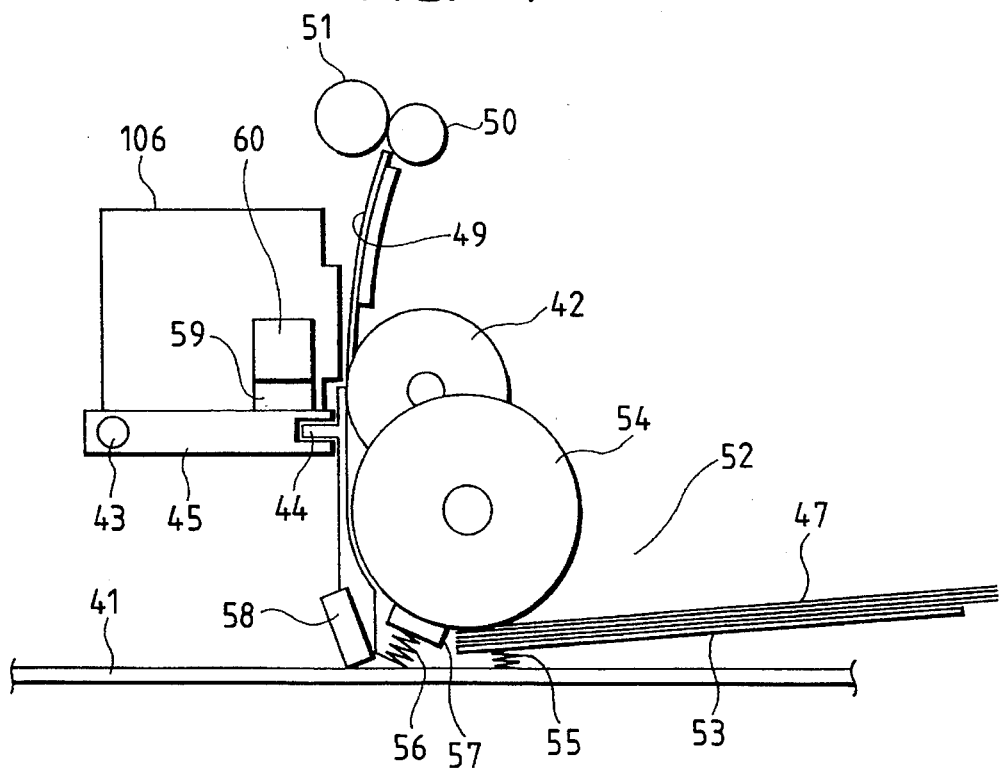
FIG. 4 is a side sectional view of the printer according to the first embodiment.

FIG. 3 is a perspective view of the ink-jet printer having the arrangement shown in FIG. 2, and FIG. 4 is a side sectional view thereof.

Referring to FIGS. 3 and 4, a sheet feed roller 42 driven by a sheet feed motor (not shown) is supported in a chassis 41 of a recording apparatus body. A guide shaft 43 and a rail 44 are parallel to the sheet feed roller 42 so as to define a sheet convey path therebetween. A carriage 45 is supported to be movable in the main scanning direction.

The recording head 106 is mounted on the carriage 45. The recording head 106 has the 128 ejection openings aligned in the subscanning direction, the electrothermal conversion elements respectively corresponding to the 128 ejection openings, and a drive means for the electrothermal conversion elements.

A pinch roller 48 is mounted on the sheet feed roller 42. The pinch roller 48 can come into contact with a sheet 47 or can be separated therefrom so as to apply a frictional convey force to the sheet 47.

A fixing device 49 is arranged on the sheet feed downstream side (upper side in FIG. 3) of the sheet feed roller 42 to enhance fixing of the ink on the sheet 47. A discharge roller 50 and a plotter roller 51 are arranged on the downstream side of the fixing device 49.

The fixing device 49 also has a guide plate function of supporting the lower surface of the sheet 47 and is constituted by a sheet heater corresponding length to almost the width of the sheet.

A cut sheet feeder 52 for automatically feeding the sheets 47 one by one is arranged on the sheet convey upstream side (lower side in FIG. 3) of the sheet feed roller 42. In the cut sheet feeder 52, a plurality of sheets 47 are clamped between a press plate 53 biased by a spring 55 upward and a paper feed roller 54, and the sheets 47 are fed one by one from the uppermost sheet. The sheets 47 driven by the paper feed roller 54 are separated one by one by a separation pad 57 urged against the paper feed roller 54 by a spring 56.

A sheet end sensor 58 is arranged near a sheet path on the paper feed roller 54 to detect the leading end, passing, and trailing end of the sheet 47. A sheet width sensor 60 is mounted on the carriage 45 through a stay 59. The sheet end sensor 58 and the sheet width sensor 60 comprise photosensors each consisting of, e.g., a light-emitting element and a light-receiving element. The recording head 106 and the sheet width sensor 60 on the carriage 45 are connected to a control circuit through a flexible cable 61.

A method of developing an image according to the present invention will be described below.

FIGS. 1A to 1D show a method of expressing a one-page image development memory using the image memory 102D. In FIGS. 1A to 1D, n=4 is given, the upper left corner of a one-page image is given as the coordinate origin (0,0), and the lower right points are given as (X,Y). The address values of the image memory 102D correspond to coordinate values.

Figure 1A:
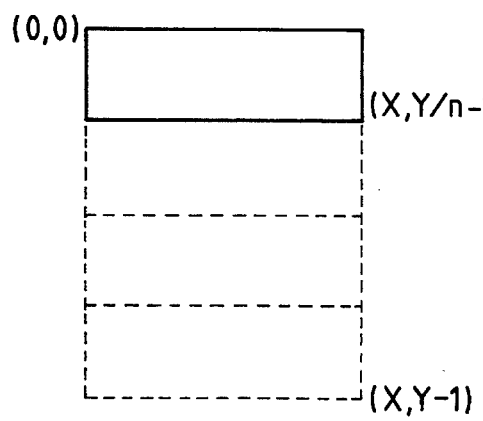
FIGS. 1A to 1D are views for explaining a memory in a printer according to the first embodiment of the present invention.
Figure 1B:
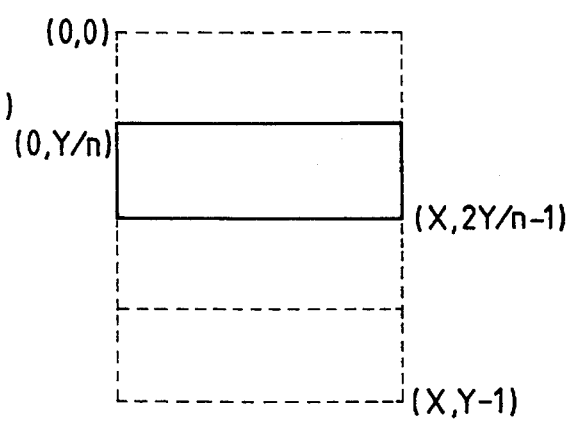
Figure 1C:
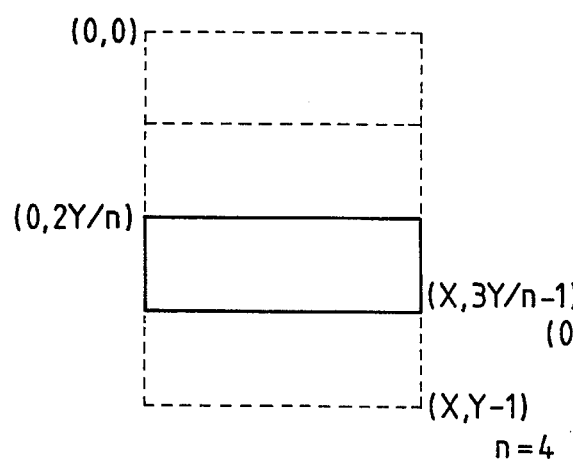
Figure 1D:
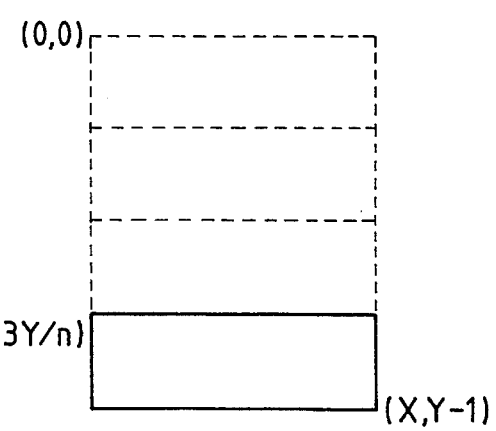

FIG. 1A shows a state immediately before image development, i.e., a state wherein address values of the image memory are reset. In this case, the start address of the image memory is given as (0,0) and its end address is given as (X,Y/n−1). One-page image development for the first time is completed in this state. Immediately before image development for the second time, the start address is given as (0,Y/n) and the end address is given as (X,2Y/n−1), as shown in FIG. 1B, thereby performing one-page image development. Similarly, in image development for the third time, the start address is given as (0,3Y/n−1) and the end address is given as (X,3Y/n−1), as shown in FIG. 1C. In image development for the fourth time, the start address is given as (0,3Y/n) and the end address is given as (X,4Y/n−1), as shown in FIG. 1D. In each cycle, only the area corresponding to the size of the image memory 102D can be accessed. However, when the memory access is viewed from the MPU 102A for accessing the image memory 102D, the image memory can be addressed in the same manner as in a one-page image memory. Image data corresponding to the addresses are written in the area in which the image memory 102D is present. Image data written in the area in which the image memory 102D is not actually present is abandoned. Every time the start address of the image memory 102D is updated, one-page image data development is performed four times. ¼-page recording is performed on the basis of the image data stored in the image memory 102D upon completion of each development cycle. Therefore, one-page image can be recorded. This operation will be described with reference to an actual recording operation.

Figure 5:
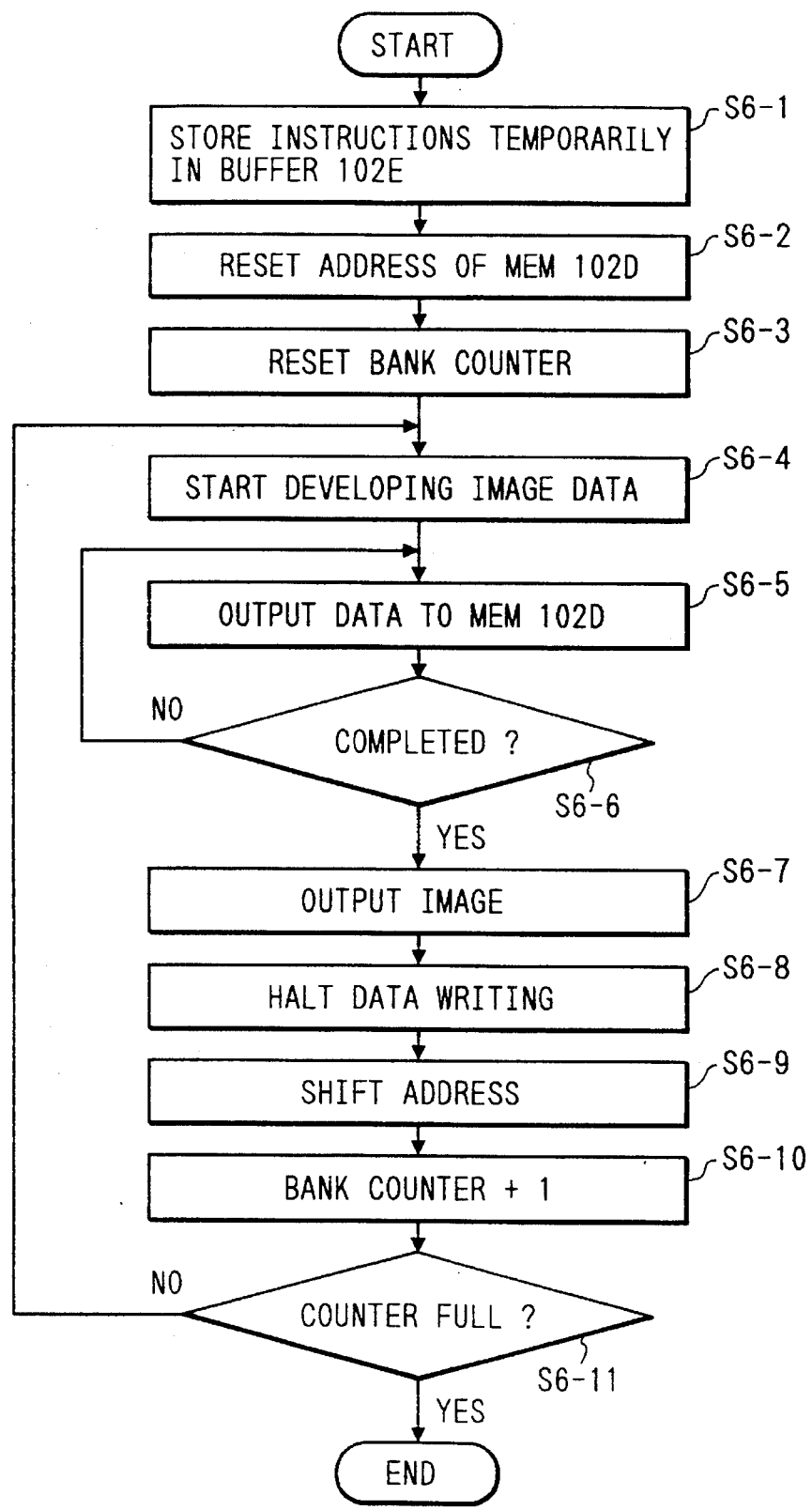
FIG. 5 is a flow chart for explaining an operation of the first embodiment of the present invention.

FIG. 5 is a flow chart for explaining the above development method. When coded data such as a page description language is output from the host computer 101 to this printer, the buffer 102E in the printer temporarily stores this instruction (step S6-1). The address of the image memory 102D for storing the developed bit image data is reset to (0,0) (step S6-2). A bank counter for counting a development order is set (step S6-3), and the page description language in the buffer 102E is read out, and image data development is started (step S6-4). The developed bit image data is written in the image memory 102D (step S6-5). When development processing of the coded data in the buffer 102E is completed (step S6-6), the image data is output from the image memory 102D, and image recording is performed (step S6-7). At this time, the recording head 106 is stopped when all the image data are read out from the image memory 102D, and the recording head 106 waits for the next image data (step S6-8). The start address is shifted to a position where its value is larger than the previous end address by one (step S6-9). The bank counter is incremented by one (step S6-10). When the count of the bank counter is larger than a predetermined value, i.e., when the end address of the image memory 102D is larger than the end address of the image, a series of operations are completed.

Figure 6A:
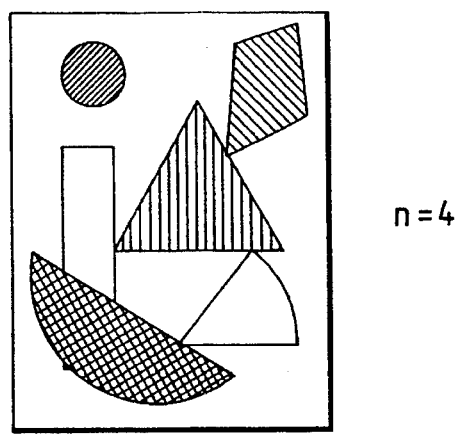
FIGS. 6A to 6E are views for explaining an image recorded at the printer according to the first embodiment of the present invention.
Figure 6B:
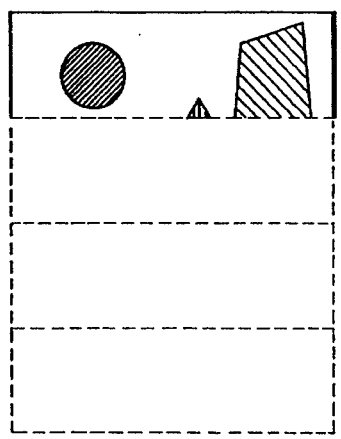
Figure 6C:
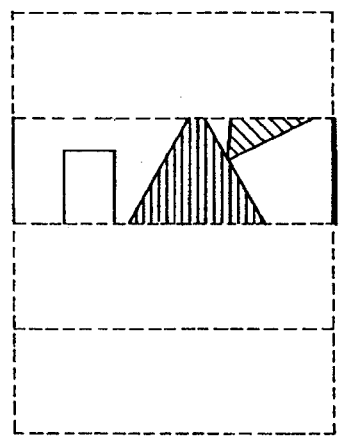
Figure 6D:
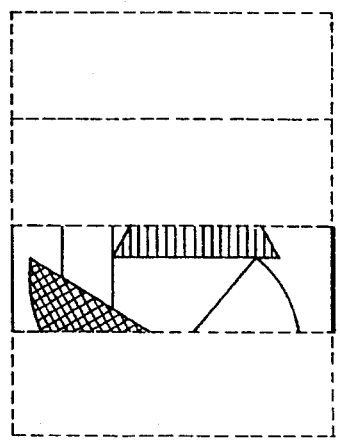
Figure 6E:
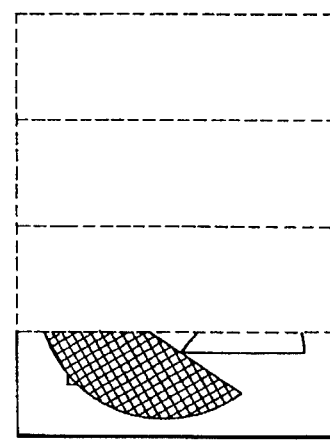

FIGS. 6A to 6E are views for explaining an image recorded at the end of development processing when the size of the image memory 102D is ¼ the page memory. FIG. 6A shows an image to be recorded, FIG. 6B shows an image to be recorded when the image memory 102D is developed in a state shown in FIG. 1A, FIG. 6C corresponds to FIG. 1B, FIG. 6D corresponds to FIG. 1C, and FIG. 6E corresponds to FIG. 1D.

Figure 7:
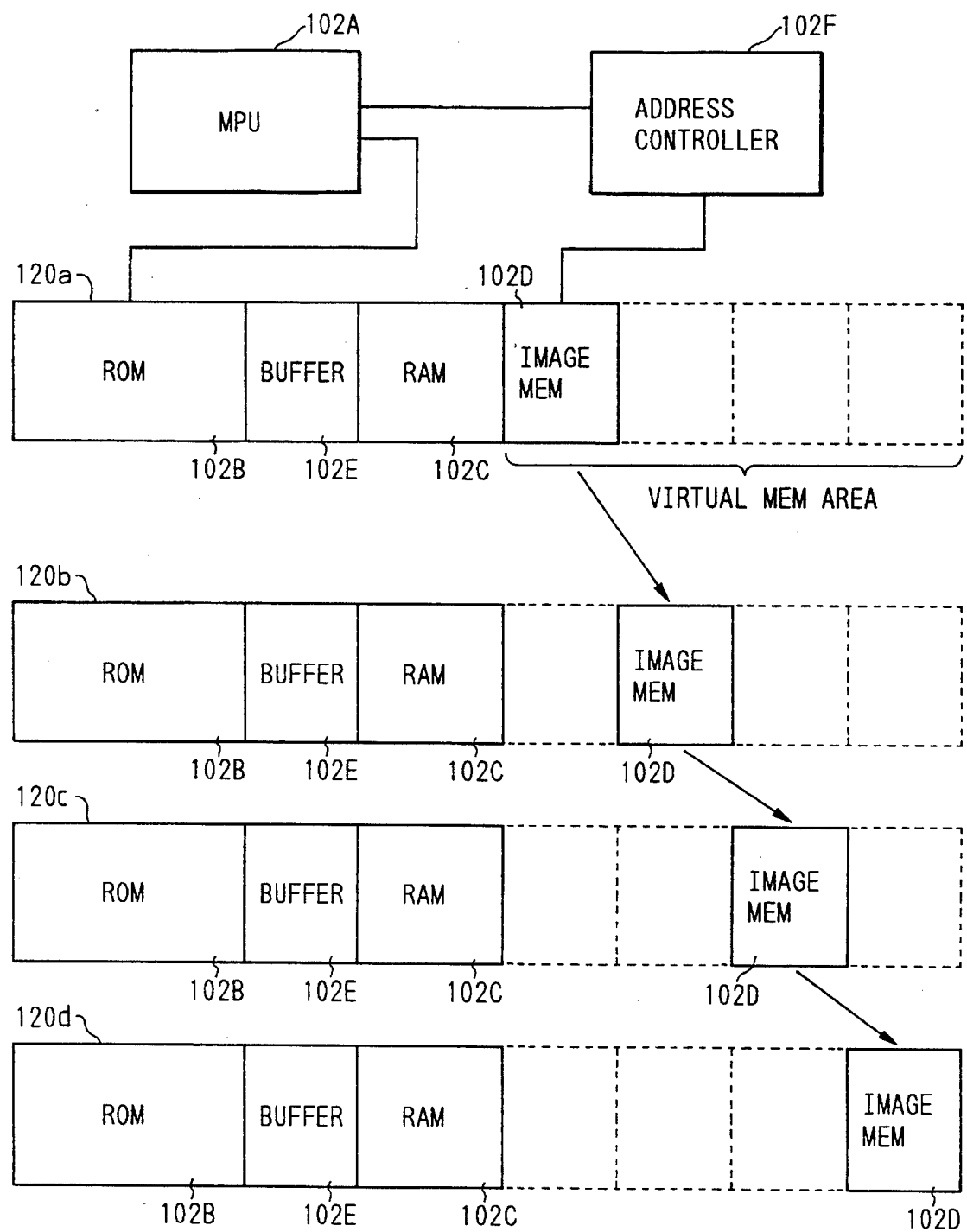
FIG. 7 is a block diagram showing an arrangement associated with memory address switching in the printer according to the first embodiment of the present invention.

A technique for shifting the memory address will be described below. FIG. 7 is a block diagram showing a hardware arrangement associated with address shift. The MPU 102A has address spaces 102a to 102d. When coded data such as a page description language is sent from the host computer 101 to the printer, the coded data is temporarily stored in the buffer 102E. The coded data is read out from the buffer 102E, and image data to be developed is written in a virtual memory area including the image memory 102D. As described with reference to the flow chart in FIG. 5, the address controller 102F causes the bank counter to update the addresses of the image memory 102D within the virtual memory area. The virtual memory area is divided into four regions as in FIGS. 1 and 6. The address of the image memory 120D is shifted from the address space 120a to the address spaces 120b, 120c, and 120d.

When the virtual memory area is accessed by the MPU 102A in accordance with 16-bit addressing, i.e., when the most significant bit (15th bit) of the address is "1", the address controller 102F outputs values obtained by subtracting the count of the bank counter from the values of the 13th and 14th bits of the address as the 13th and 14th bits.

However, two image memories may be arranged. These two memories are allocated in the virtual memory area, as indicated by 120a to 120d, so that image data can be written in one image memory simultaneously when image data can be read out from the other image memory.

[Second Embodiment]

Figure 8:
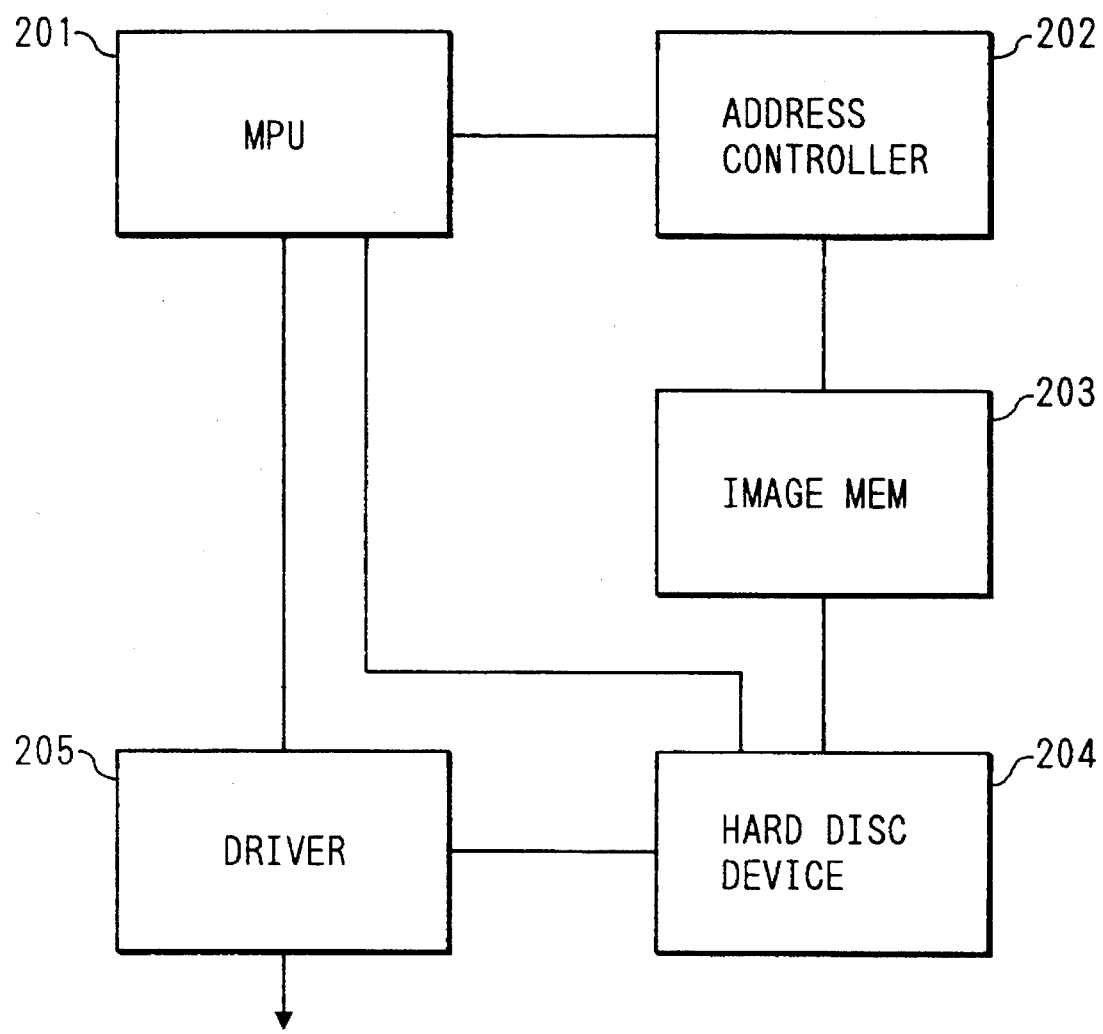
FIG. 8 is a block diagram showing a printer according to the second embodiment of the present invention.

FIG. 8 is a block diagram showing the second embodiment of the present invention. A printer of this embodiment includes an MPU 201 for controlling the overall operation of the printer, an address controller 202 for controlling addresses of an image memory 203, a hard disc device 204 for receiving data transferred from the image memory 203, and a driver 205 for outputting bit map data from the hard disc device 204 to record an image.

Steps up to image output will be described with reference to a flow chart in FIG. 9.

When a page description language is output from the host computer to the printer, the instruction is temporarily stored in the buffer (step S9-1). The address of the image memory 203 for developing an image is reset to (0,0) (step S9-2). A bank counter for counting a developing order is set to zero, i.e., is reset (step S9-3). The page description language in the buffer is read out and developing of image data is started (step S9-4). The developed data is bit map data, and the bit map data is stored in the image memory 203 (step S9-5). When write access of the instruction storage buffer is completed (step S9-6), the data is output from the image memory 203 to the hard disc device 204 (step S9-7). When data transfer is completed, the address of the image memory 203 is shifted so that its start address is located at a position larger than the previous end address by one (step S9-8), and the bank counter is incremented (step S9-9). When the count of the counter is larger than a predetermined value, i.e., when the end address of the image memory 203 is larger than that of the page memory, image development is ended. Finally, the data is output from the hard disc device 204 to the driver 205, and one-page image recording is performed, thereby completing the processing. As described above, when one-page bit image data is stored using the hard disc device, image output can be performed without interrupting the operation of the printer head, unlike the first embodiment.

[Third Embodiment]

An MPU 201 may be switched to perform control in the first or second embodiment in accordance with whether an external hard disc device 204 is connected to the printer or not. This determination can be performed in accordance with designation from a data input device 109 or a response signal from the hard disc device 204.

As described above, the present invention utilizes a memory capable of storing 1/n-page bit image data. The address of this memory is shifted to perform one-page image recording even if a printer output request is designated by an instruction of a page description language. In particular, in a large-capacity memory in a multi-color printer device or the like, the memory capacity can be largely reduced at low cost. When an external hard disc device is connected to the printer, a split buffer need not be used, and a one-page developed image can be directly stored in the hard disc device.

[Fourth Embodiment]

The fourth embodiment of the present invention will be described below.

Figure 17:
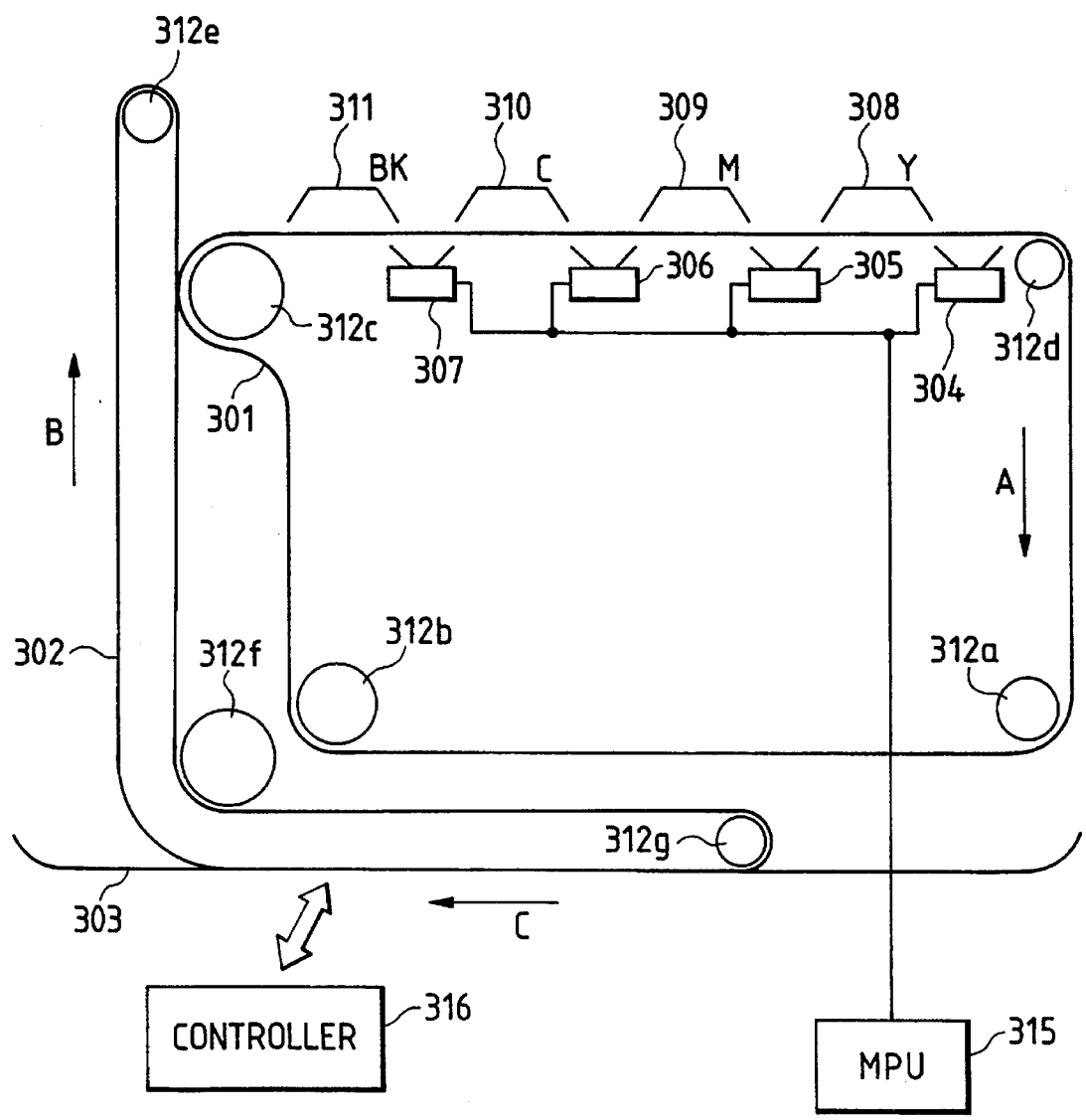
FIG. 17 is a block diagram showing an arrangement of a multi-color printer according to the fourth embodiment of the present invention.

FIG. 17 is a block diagram showing an arrangement of a multi-color printer according to the fourth embodiment of the present invention.

The multi-color printer includes a photosensitive belt 301 serving as a latent image carrier for a latent image to be developed by this printer. A photoconductive charging layer is formed on the surface of a conductive belt to form the photosensitive belt 301. A yellow image exposure device 304, a magenta image exposure device 305, a cyan image exposure device 306, and a black image exposure device 307 are sequentially arranged above the photosensitive belt 301 in the downstream convey direction of the photosensitive belt 301. A yellow developing device 308, a magenta developing device 309, a cyan developing device 310, and a black developing device 311 are arranged in correspondence with the yellow, magenta, cyan, and black image exposure devices 304, 305, 306, and 307, respectively. The photosensitive belt 301 is held by rollers 312a to 312d and is in contact with a transfer belt 302. A transfer belt 302 serves as an image carrier for temporarily receiving a multi-color image formed on the photosensitive belt 301. The transfer belt 302 is carried by rollers 312e to 312g. An image transferred onto the transfer belt 302 is finally transferred on recording paper 303. Although not shown, a registration roller and a conveying roller for conveying the recording paper 303 are present in front of and behind the recording paper 303. A microprocessor (MPU) 315 controls, e.g., a bias power source to automatically select an image color. The MPU 315 also controls the image exposure devices 304 to 307 to print images having desired colors on the recording paper 303. A controller 316 controls data developing operations (to be described later). An arrow A in FIG. 17 represents a rotational direction of the photosensitive belt 301; B, a convey direction of the transfer belt 302; and C, a convey direction of the recording paper 303.

A method of developing an image according to the fourth embodiment of the present invention will be described below.

Figure 18A:
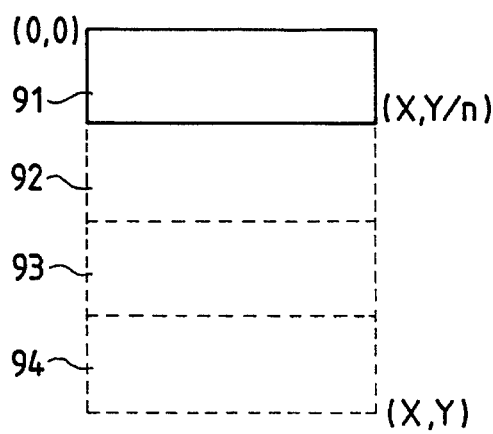
FIGS. 18A to 18D are views for explaining a method of expressing one-page data of an image development memory using split memories.
Figure 18B:
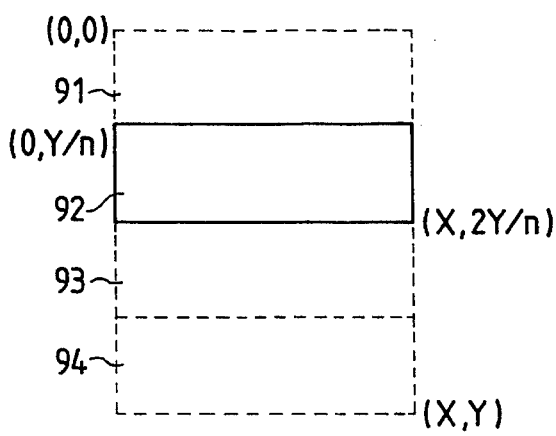
Figure 18C:
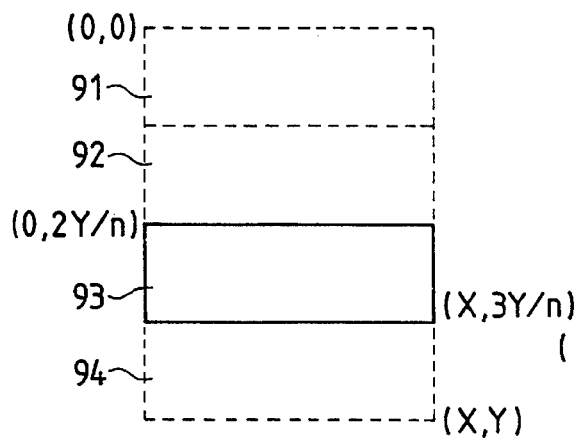
Figure 18D:
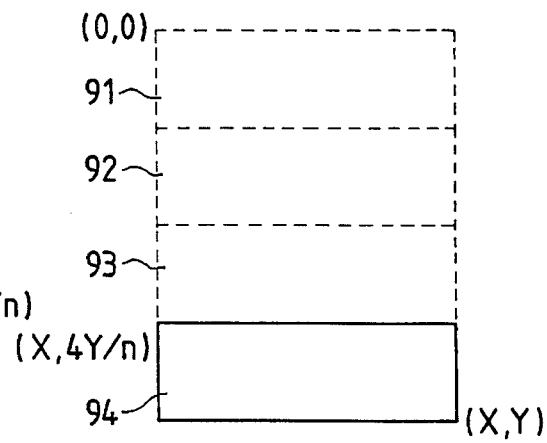

FIGS. 18A to 18D are views for explaining a method of expressing a one-page image development memory using split memories. The upper left corner of the one-page memory is given as the coordinate origin (0,0), and the lower right point is given as (X,Y). ¼-page memories are given as split memories 91 to 94, respectively. FIG. 18A shows a reset state of all the memories 91 to 94 prior to image development. In this case, the start address of the memory is given as (0,0), and the end address is given as (X,Y/n). This state corresponds to the split memory 91. Immediately before image development for the second time upon completion of image development for the first time, the start address is given as (0,Y/n) and the end address is given as (X,2Y/n). This state corresponds to the split memory 92. Similarly, immediately before image development for the third time, the start address of the memory is given as (0,2Y/n) and the end address thereof is given as (X,3Y/n). This state corresponds to the split memory 93. Immediately before image development for the fourth time, the start address is given as (0,3Y/n), and the end address is given as (X,4Y/n). This state corresponds to the split memory 94. In any case, data is stored in an amount corresponding to the size of each split memory in practice. When viewed from the side controlling memory access, addressing is performed as if a one-page memory is present. When viewed from the side controlling image development, the page memory has a one-page capacity, and data corresponding to the address of an area in which each split memory is present is written in the corresponding split memory. The data written in an area in each memory is not actually present is abandoned.

When the same data development from yellow to black is performed four times every time the start address of the memory is shifted, one-page data is formed. A combination of this operation with control of a printer engine will be described below.

Figure 19A:
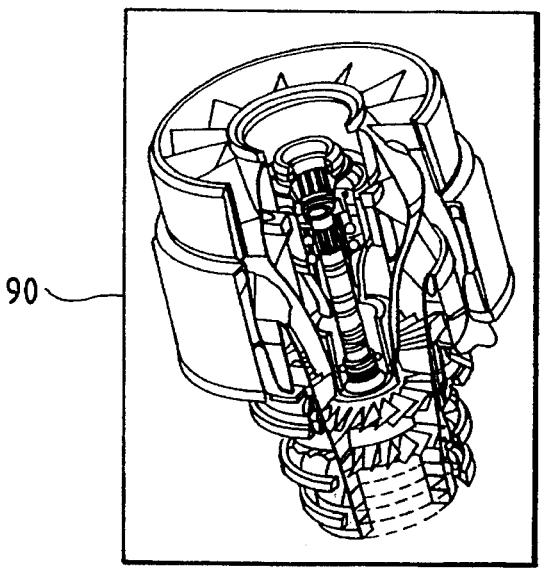
FIGS. 19A to 19E are views showing memory contents of the split memories according to the fourth embodiment.
Figure 19B:
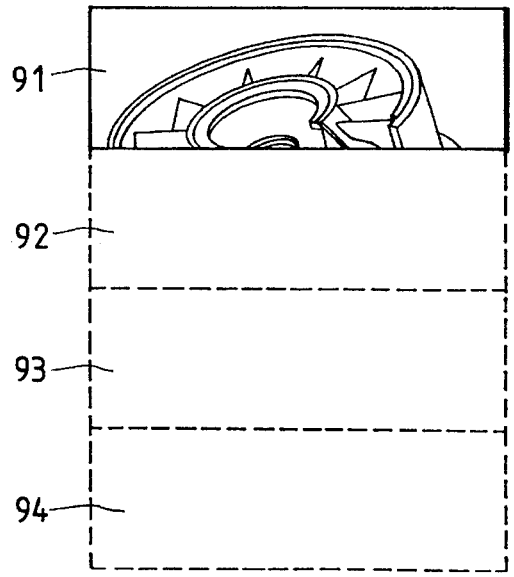
Figure 19C:
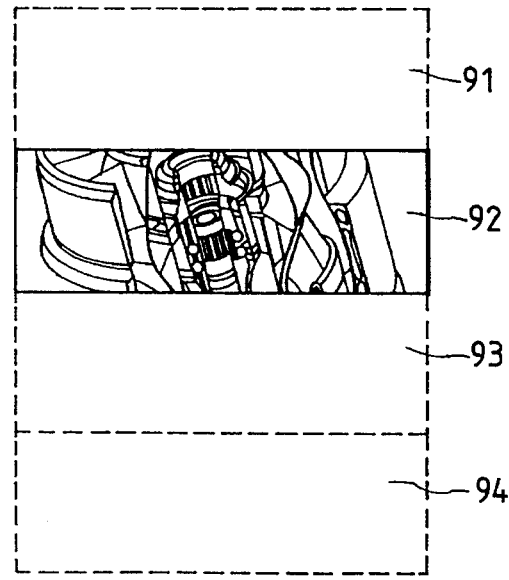
Figure 19D:
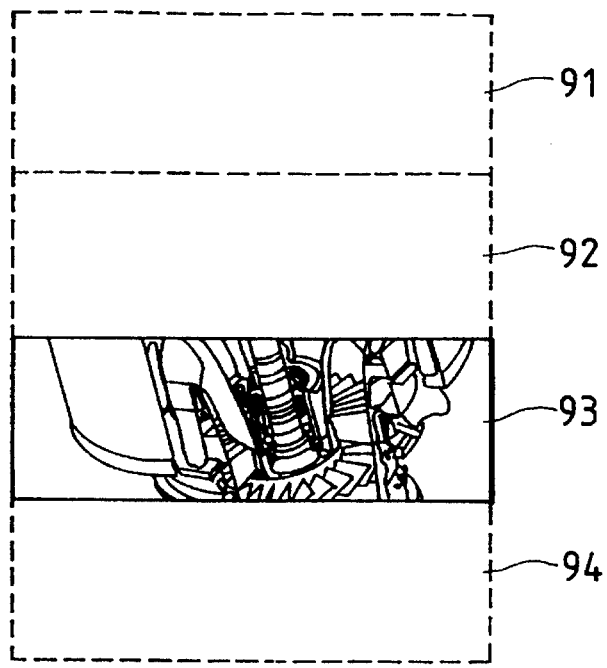
Figure 19E:
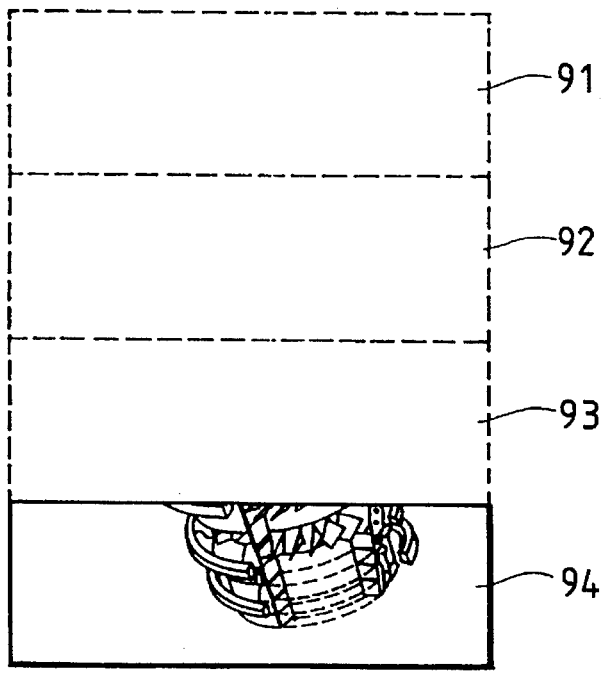

FIGS. 19A to 19E show contents of the split memories according to the fourth embodiment. FIG. 19A shows an original image 90 developed in the page memory. FIG. 19B shows a case wherein the split memory 91 stores the uppermost ¼ portion of the original image 90. Similarly, FIG. 19C shows a case wherein the split memory 92 stores the upper ¼ portion of the original image 90, FIG. 19D shows a case wherein the split memory 93 stores the lower ¼ portion of the original image 90, and FIG. 19E shows a case wherein the split memory 94 stores the lowermost ¼ portion of the original image 90. In this manner, the original image 90 is stored in the split memories in a divided form.

A technique for shifting the memory address will be described below.

Figure 20:
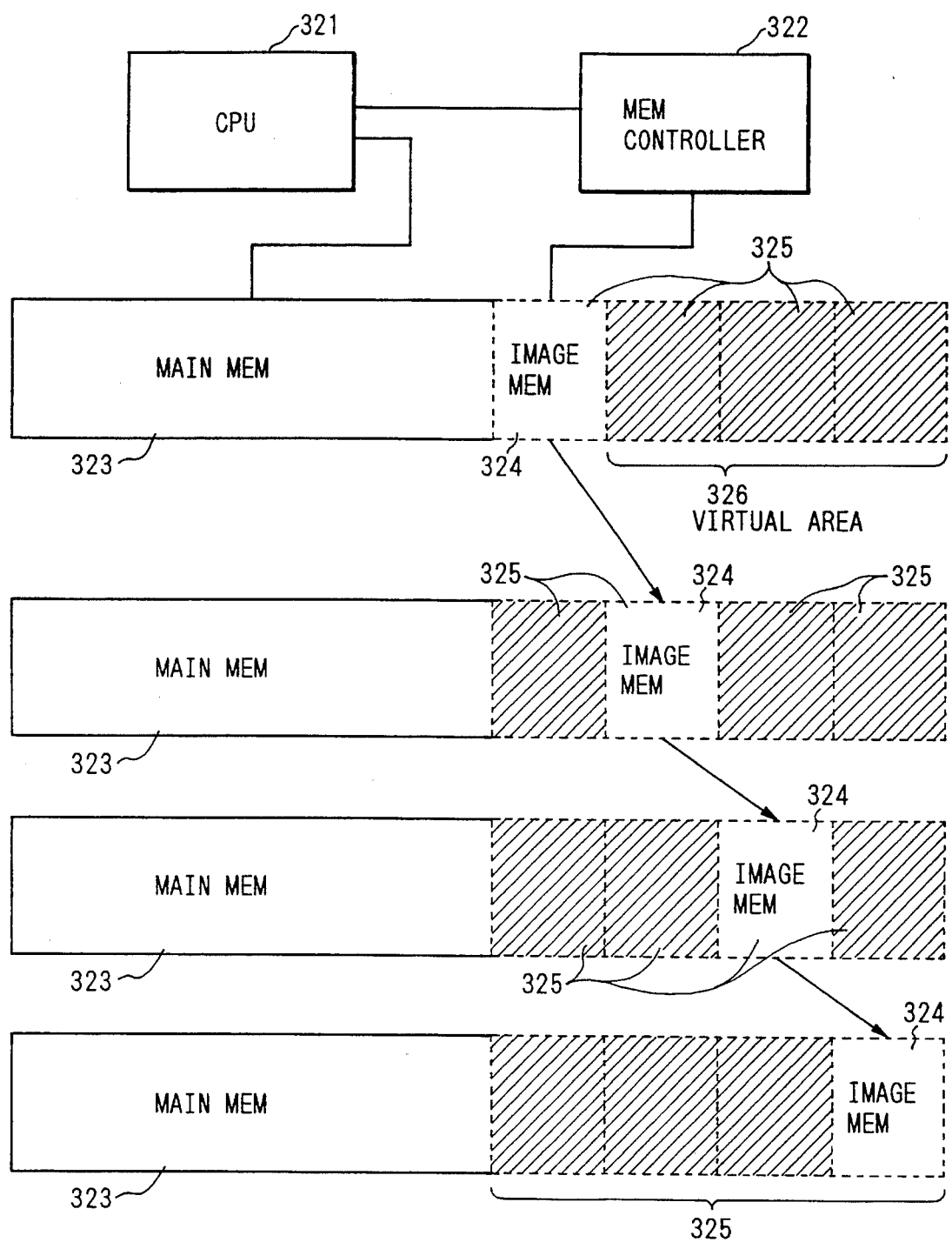
FIG. 20 is a block diagram showing an arrangement of a controller 16 according to the fourth embodiment.

FIG. 20 is a block diagram showing an arrangement of the controller 316 of the fourth embodiment. The controller 316 comprise a CPU 321 incorporating a ROM for storing a program or the like in accordance with the flow chart in FIG. 5 and operated in accordance with the program stored in the ROM, a memory controller 322 for controlling an image memory, a main memory 323 serving as a temporary memory in a printer, an image memory 324 used as existing split memories, a virtual memory 325 including the real split memory (image memory 324) and virtual split memories, and a virtual area 326 consisting of virtual split memories. The image memory 324 has a capacity of one split memory and is selected as one of the split memories 91 to 94 under the control of the memory controller 322.

In operation, when a page description language is sent from a host computer (not shown), image data is stored in the main memory 323. The image data is read out from the main memory 323, and part of the original image data is developed and written in the image memory 324 serving as one real memory of the split memories 91 to 94 under the control of the memory controller 322. In this case, the memory controller 322 updates the address of the real split memory within the virtual memory 325 in correspondence with the bank counter described with reference to the flow chart in FIG. 5. In this manner, addressing is performed so that the real memory is accessed in an order of the split memories 91 to 94.

A detailed operation will be described below.

FIG. 5 is the flow chart for explaining a method of developing data by the CPU 321 of the fourth embodiment.

When a page description language is output from a host computer (not shown) to this printer, the instruction is stored in the main memory 323 in the printer (step S6-1). The address of the split memory for developing the image data is reset to (0,0) (step S6-2). A bank counter for counting a developing order is reset, i.e., is set to zero (step S6-3). The page description language is read out from the main memory 323 and development of the image data is started (step S6-4). The developed data serves as bit map data, and the bit map data is written in the area of the split memory (step S6-5). Part of the developed data (i.e., data corresponding to the capacity of one split memory) in the main memory 323 which stored the instructions in step S6-1 is entirely output to the split memory (step S6-6). The developed data in the split memory is output to a printer engine (not shown) (step S6-7). Marking is required on the photosensitive belt 301 to align data output from one split memory. This printer engine has a function of marking an end position of the data from the split memory on the photosensitive belt 301 and a function of detecting this mark and informing a memory data write start; position. When the data is output from the split memory to the photosensitive belt 301, this mark is detected and data output is started from this detected mark.

When the data from the split memory is recorded as a latent image, the printer engine temporarily halts write access and waits for data from the-next split memory (step S6-8). The split memory is shifted to a position where the start address is updated to a value obtained by incrementing the previous end address by one (step S6-9). The bank counter is incremented (step S6-10). When the count of the counter is larger than a predetermined value, i.e., when the end address of the split memory is larger than the end address of the page memory, a series of operations are completed. Address calculations of the split memory are performed as described with reference to FIGS. 18A to 18D.

As described above, according to the fourth embodiment, split memories are selectively used as the image memory, and the address of the memory is arbitrarily shifted. In particular, when a printer output request is represented by a page description language, development continues until these instructions can be expressed by one page by means of the split memories. Therefore, page description can be achieved by using a small memory capacity, thereby providing a low-cost multi-color electrophotographic printer apparatus.

[Fifth Embodiment]

The fifth embodiment: will be described below.

Figure 21:
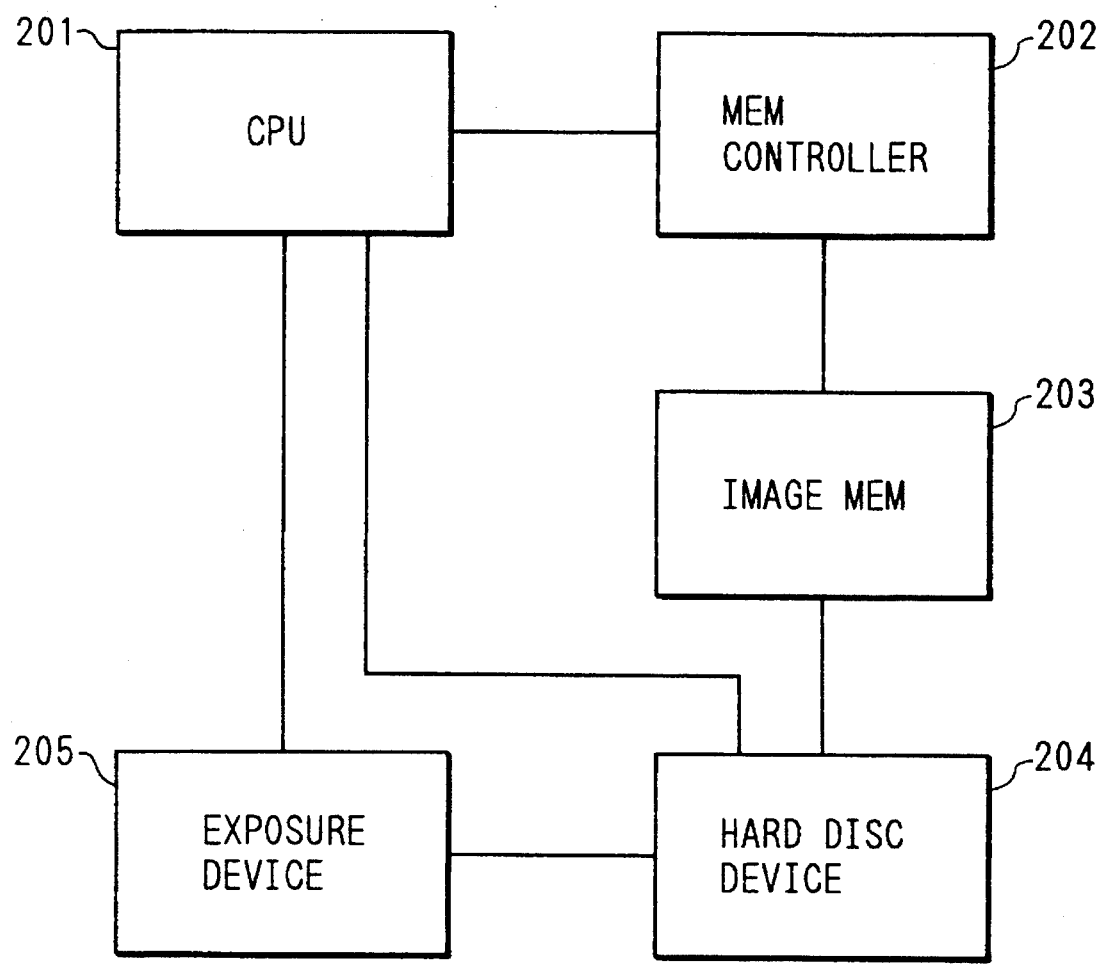
FIG. 21 is a block diagram for explaining an arrangement of a main part of a multi-color printer according to the fifth embodiment of the present invention.

FIG. 21 is a block diagram for explaining an arrangement of a main part of a multi-color printer according to the fifth embodiment of the present invention. This multi-color printer comprises a CPU 01 for controlling the overall operation of the printer. The CPU 201 incorporates a ROM which stores a program or the like in accordance with a flow chart in FIG. 9 and is operated on the basis of the program stored in the ROM. The printer also includes a memory controller 202 for controlling split memories, an image memory 203 described with reference to the fourth embodiment, i.e., an image memory having a capacity equal to that of each split memory, a hard disc device 204 for transferring data stored in the split memory (image memory 203), and an exposure device 205 for outputting bit map data stored in the hard disc device 204.

An operation of the fifth embodiment will be described in correspondence with that of the fourth embodiment.

Figure 9:
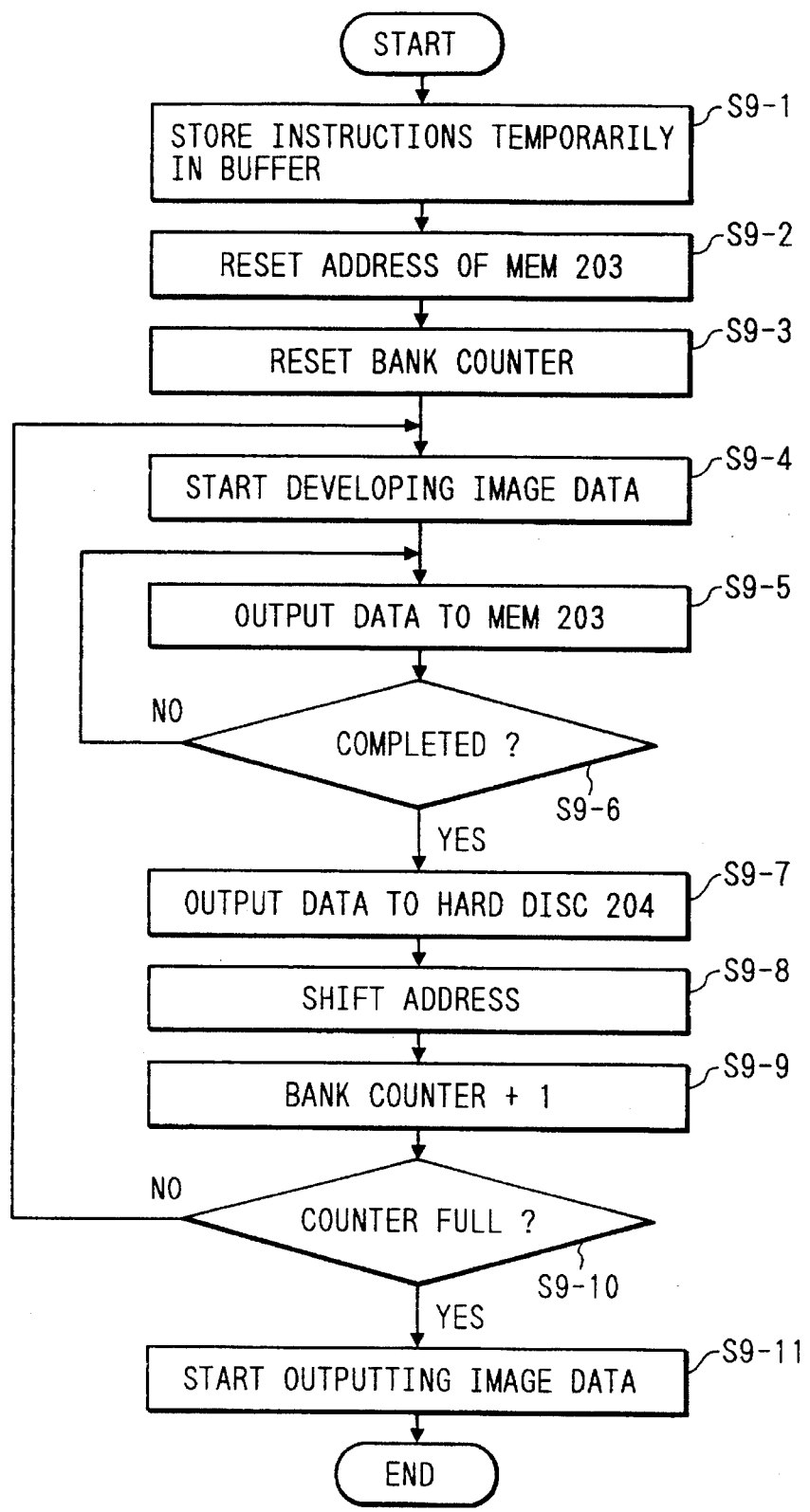
FIG. 9 is a flow chart for explaining the operation of the second embodiment of the present invention.
Figure 10:
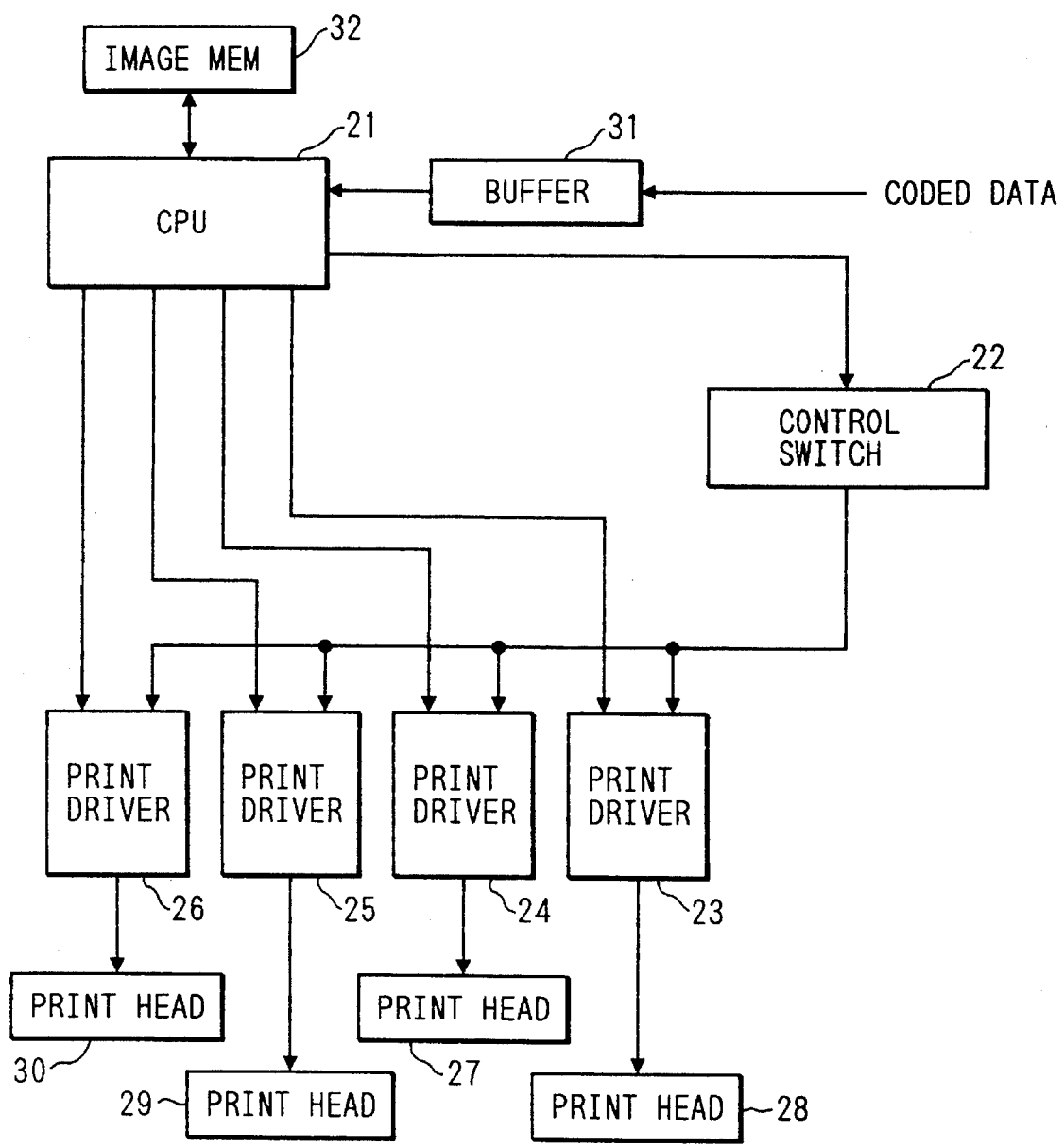
FIG. 10 is a block diagram showing a conventional printer.
Figure 11:
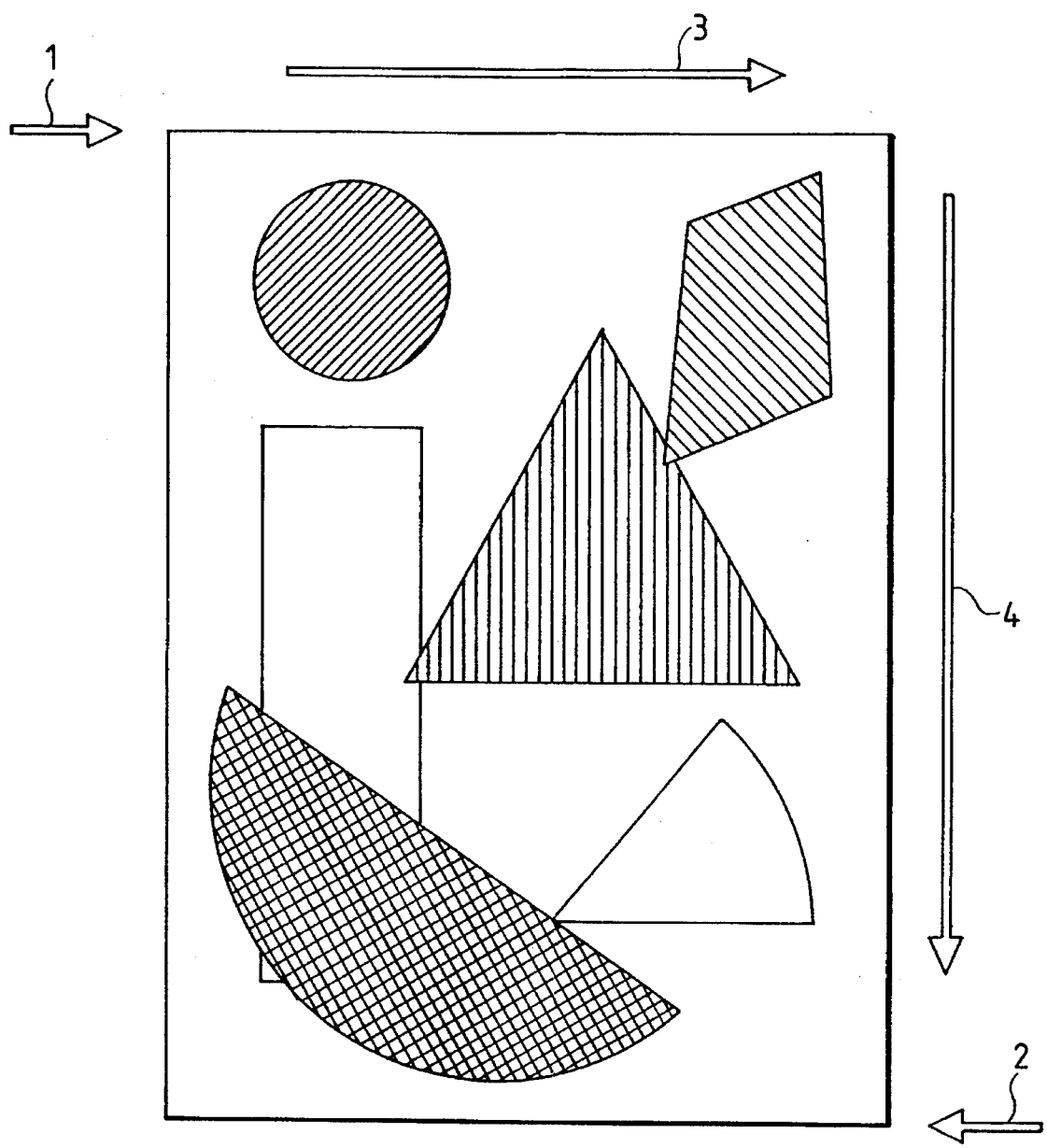
FIG. 11 is a view for explaining a conventional recording operation.
Figure 12:
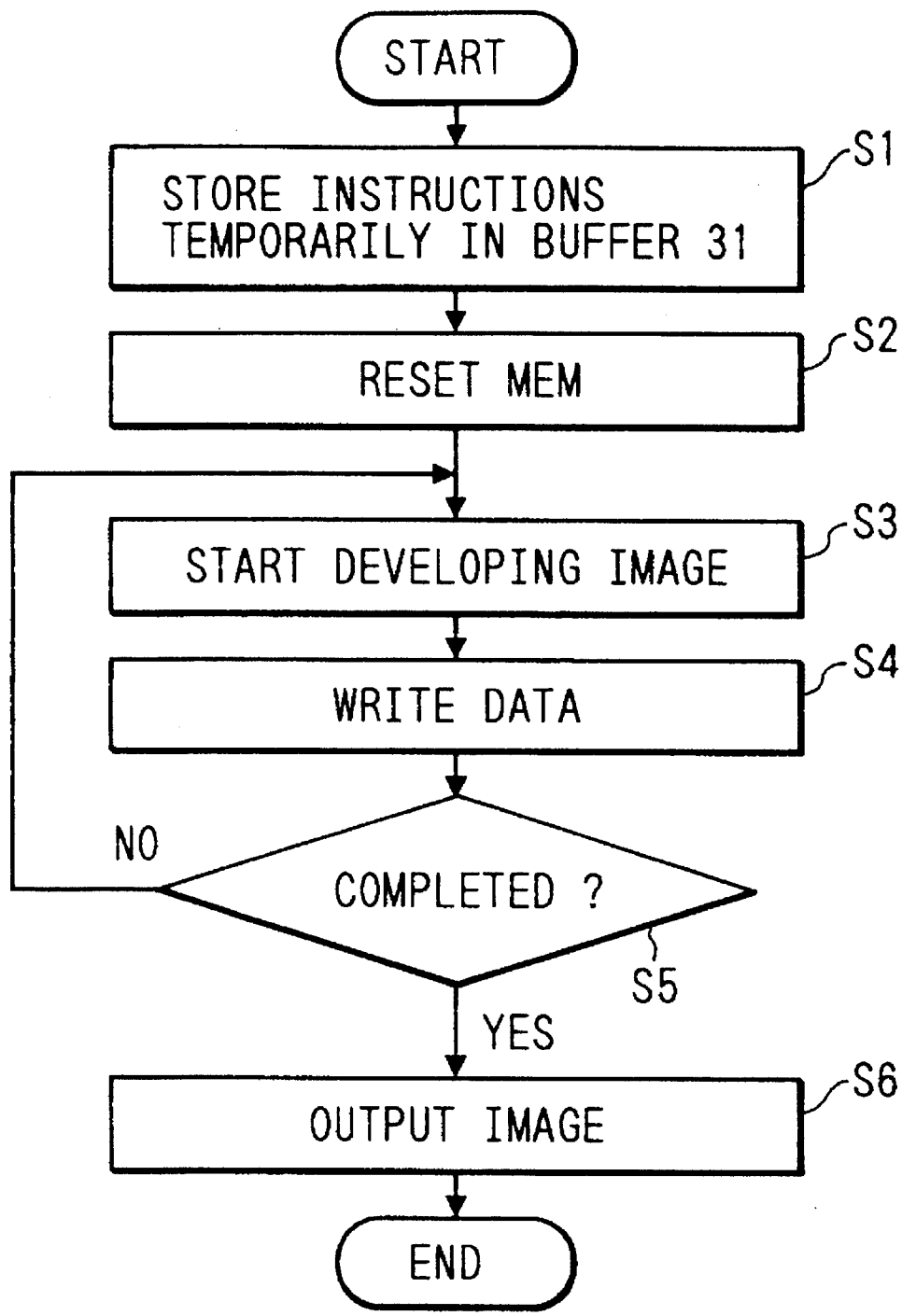
FIG. 12 is a flow chart for explaining the conventional recording operation.
Figure 13:
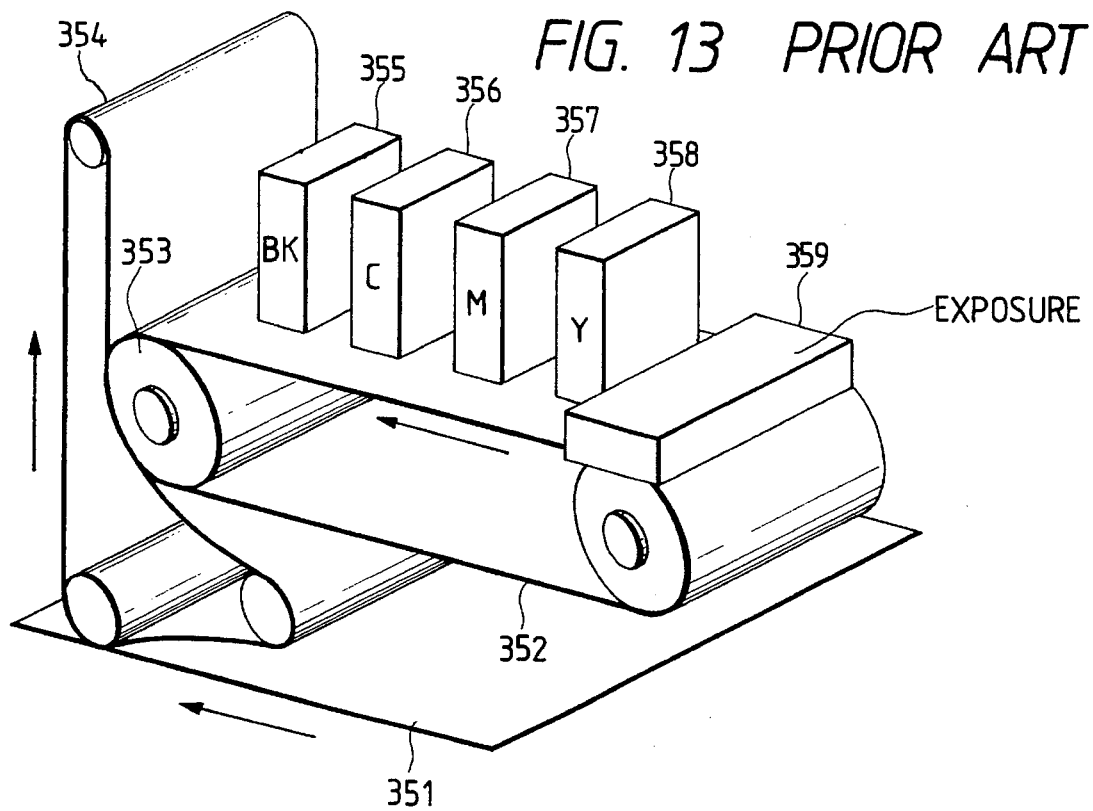
FIGS. 13 and 14 are perspective views showing an arrangement of a main part of a conventional multi-color printer.
Figure 14:
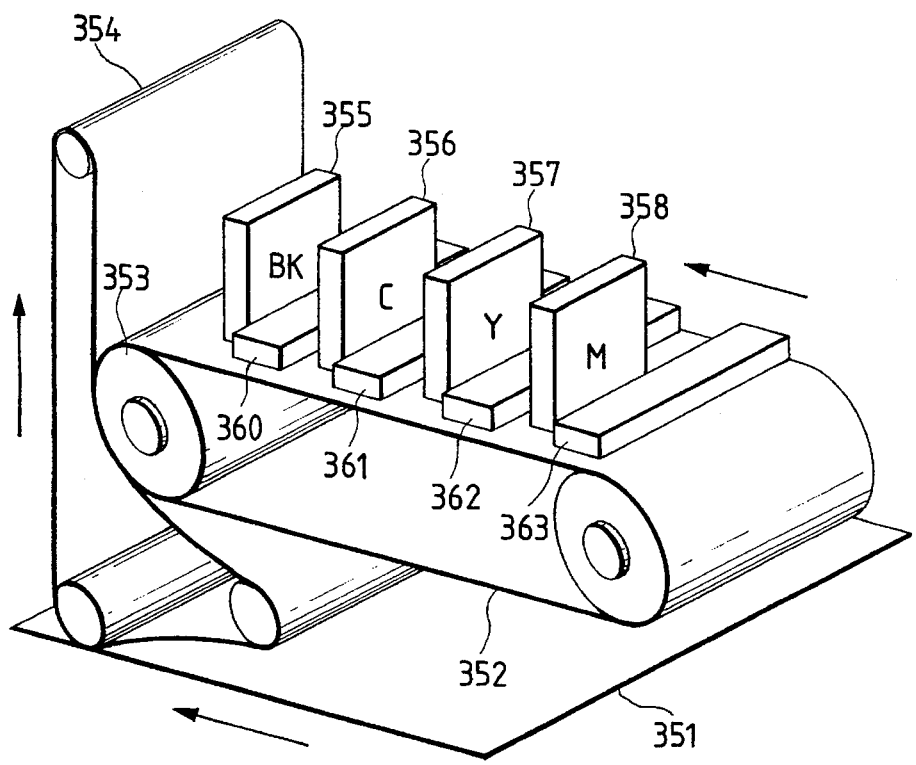
Figure 15:
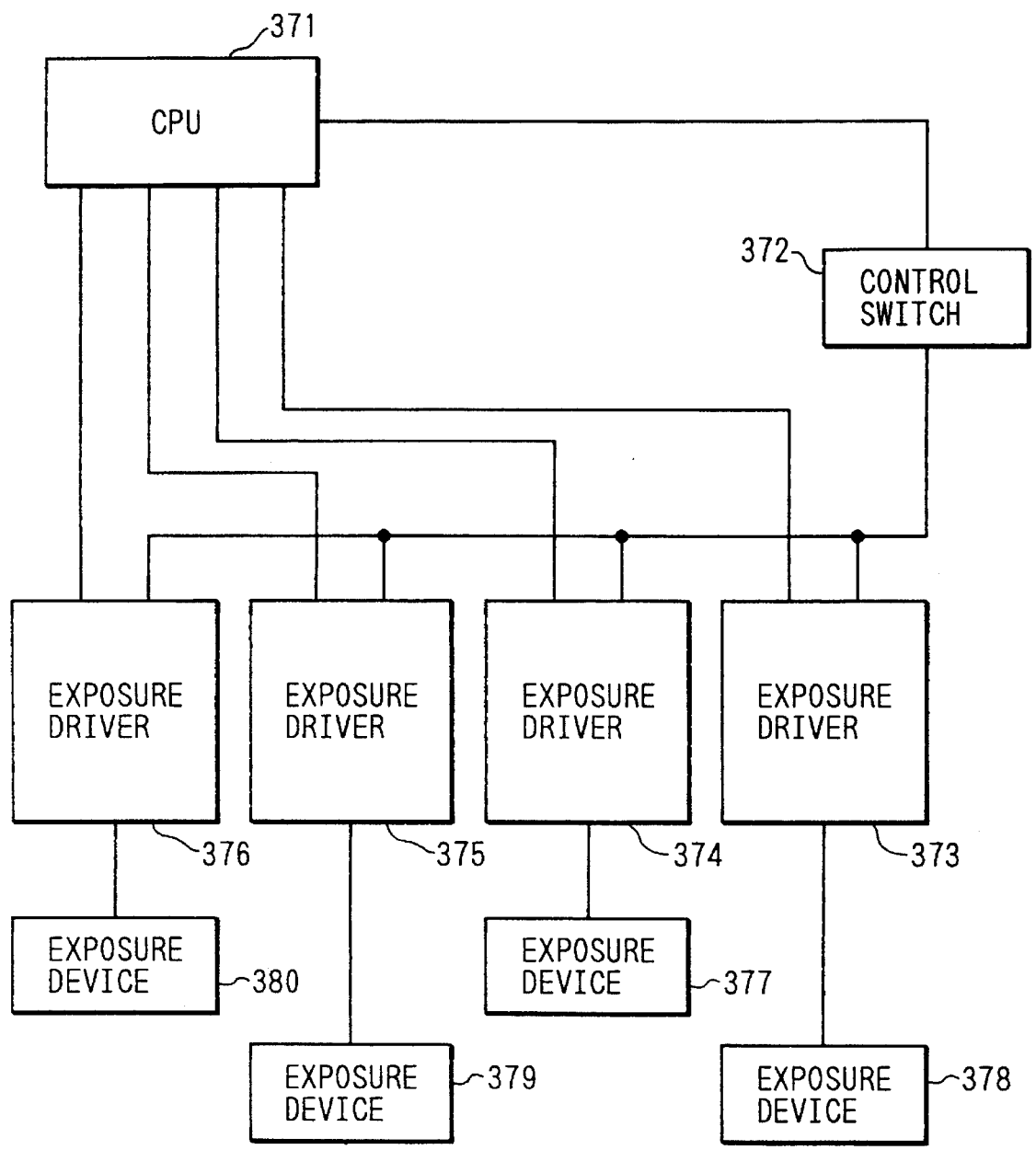
FIG. 15 is a block diagram showing an operation for outputting external input image data on recording paper.
Figure 16:
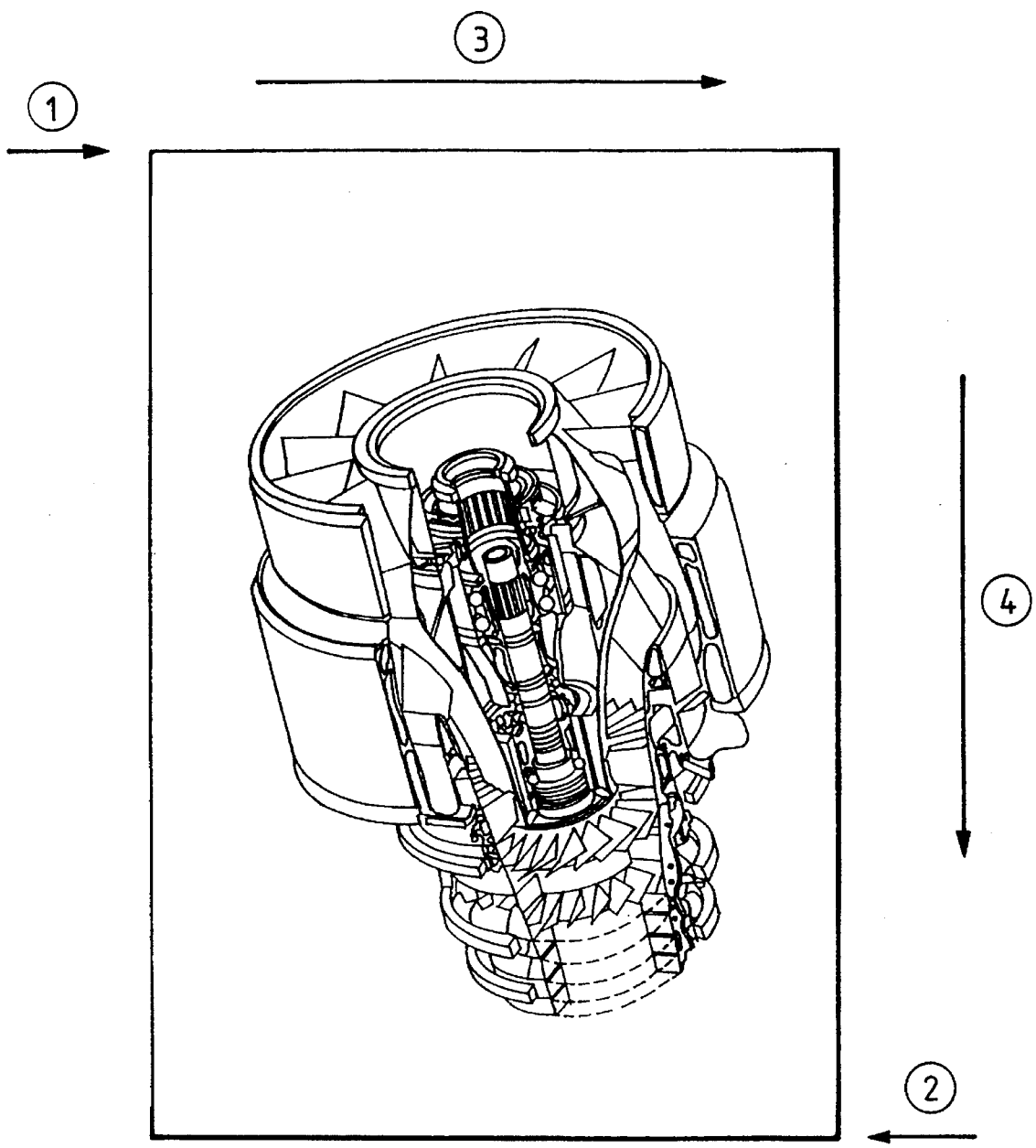
FIG. 16 is a view showing a sample image developed in an image memory.

FIG. 9 is a flow chart for explaining a method of developing data by the CPU 201 of the fifth embodiment. This flow chart describes operations up to exposure.

Resetting in steps S9-1 to S9-3 and image data development in steps S9-4 to S9-6, and data output to the split memory are the same as those in the fourth embodiment described with reference to FIG. 5. Only different steps will be described below.

In the fifth embodiment, data in the split memory is output to the hard disc device 204. When data transfer is completed as in the fourth embodiment, the start address of the split memory is shifted to a position obtained by incrementing the previous end address by one (step S9-8), and the bank counter is incremented (step S9-9). When the count of the counter is larger than a predetermined value, i.e., when the end address of the split memory is larger than the end address of the page memory, image development is completed (step S9-10).

In the fifth embodiment, the data in the hard disc device 204 is output in synchronism with the exposure device in the last step, and latent image formation on the photosensitive body is completed (step S9-11).

As described above, according to the fifth embodiment, when a hard disc device is used as an image memory, an image can be output without interrupting the operation of the photosensitive body, unlike the fourth embodiment.

As has been described above, according to the present invention, since page description can be made with a small memory capacity, a low-cost multi-color electrophotographic printer apparatus can be provided.

As shown in FIG. 5, the recording head 106 is stopped upon output of the image data after an image stored in a given area is output in step S6-7. However, until the next recording is started, the head 106 may be moved to a capping position (not shown) to prevent the ink from being dried immediately after the image output is performed or when a predetermined period of time has elapsed. When the next output may be immediately generated after the head returns to the capping position, the output operation is immediately started. When the output operation is not immediately started (steps S6-5 to S6-6) or when a predetermined period of time has elapsed, the cap may be closed to protect the head.

In addition, if the cap is opened at the start of the next output operation, preliminary injection is performed, and then the output is generated, higher output quality is obtained. The cap member may be connected to a pump device (not shown) through a tube, and may be drawn by the pump to remove the ink from the cap member and the tube after the preliminary ejection is performed.

In each of the above embodiments, after one-page bit map data is developed, and the bit image having a capacity corresponding to that of the split memory is loaded. However, the operation is not limited to this. The input page description language may be temporarily converted into coordinate data (intermediate language), and the coordinate data may be imaged for a necessary area. These control operations are performed by the MPU.

The hard disc device may be replaced with an extended RAM.

What is claimed is:

1. A recording apparatus comprising:

first memory means for receiving and storing a page description language representing one page of image data to be recorded;

second memory means for storing bit image data, said second memory means having smaller than a one-page capacity;

means for recording the bit image data stored in said second memory means;

means for generating partial bit image data of an area corresponding to said second memory means on the basis of the page description language stored in said first memory means; and control means for repeatedly controlling said second memory means and said recording means until one page of bit image data is recorded such that the partial bit image data generated by said generating means is stored in said second memory means, and such that the partial bit image data stored in said second memory means is recorded by said recording means.

2. An apparatus according to claim 1, wherein said control means further comprises an address management device for updating each partial area.

3. An apparatus according to claim 1, wherein said recording means ejects an ink droplet from an opening by means of heat energy, thereby recording the image.

4. An apparatus according to claim 3, wherein said recording means records a full-color image.

5. An apparatus according to claim 1, wherein said generating means generates the one-page bit image data, but bit image data of unnecessary areas are not stored in said memory means.

6. An apparatus according to claim 3, wherein recovery processing of said recording means is performed until the next partial bit image data is recorded after the current partial bit image data is recorded.

7. An apparatus according to claim 1, wherein recording is performed by ejecting an ink droplet by means of air flow.

8. The recording apparatus according to claim 1, wherein said first memory means comprises a reception buffer.

9. The recording apparatus according to claim 1, wherein said second memory means comprises a reception buffer.

10. A recording method comprising the steps of:

inputting and storing in a first memory control information representing one page of image data to be recorded;

generating and storing in a second memory, on the basis of the control information stored in first memory, bit image data of a partial area smaller than an output area designated by the stored control information; and repeatedly performing recording in units of partial areas until an image of the designated output area is recorded, wherein the recording comprises ejecting an ink droplet from an opening by means of heat energy and wherein a recovery process for high quality recording is executed during the recording of the image of the designated output area.

11. A method according to claim 10, wherein the method controls an address for updating said area.

12. A method according to claim 10, wherein the step of performing recording comprises full-color recording.

13. A method according to claim 10, wherein the step of storing bit image data of the partial area comprises generating bit image data of one page and storing bit image data of the partial area of one page.

14. A method according to claim 10, further comprising the step of performing recovery processing of a recording unit until the next partial bit image data is recorded after the current partial bit image data is recorded.

15. A method according to claim 10, wherein the control information input in said inputting step comprises a page description language.

16. The recording method of claim 18, wherein said first memory comprises a reception buffer.

17. The recording method of claim 10, wherein said second memory comprises a reception buffer.

18. A recording method comprising:

inputting and storing in a first memory a page description language representing one page of image data to be recorded;

generating and storing in a second memory bit image data of a partial area smaller than one page; and repeatedly performing recording in units of partial areas until a one-page image is recorded, responsive to whether or not a large-capacity memory to store bit image data is connected, wherein recovery processing of said recording unit is not performed during recording of the bit image data of one page when the bit image data from the large-capacity memory is to be recorded.

19. A method according to claim 18, wherein said method controls an address for updating the area.

20. A method according to claim 18, wherein the recording comprises ejecting an ink droplet from an opening by means of heat energy.

21. A method according to claim 20, wherein the step of performing recording comprises full-color recording.

22. A method according to claim 18, wherein the step of storing bit image data of the partial area comprises generating bit image data of one page and storing bit image data of the partial area of one page.

23. A method according to claim 18, wherein recording is performed by ejecting an ink droplet by means of air flow.

24. The recording method of claim 18, wherein said first memory comprises a reception buffer.

25. The recording method of claim 18, wherein said second memory comprises a reception buffer.

26. A recording apparatus comprising:

first memory means for receiving and storing a page description language representing one page of the image data to be recorded;

second memory means for storing bit image data, said second memory means having smaller than a one-page capacity;

means for recording the bit image data stored in said second memory means;

means for generating partial bit image data of an area corresponding to said second memory means on the basis of the page description language stored in said first memory means; and control means for repeatedly controlling said second memory means and said recording means, responsive to whether or not a large-capacity memory to store bit image data is connected to said apparatus, until one page of bit image data is recorded such that the partial bit image data generated by said generating means is stored in said second memory means, and such that the partial bit image data stored in said second memory means is recorded by said recording means.

27. An apparatus according to claim 26, further comprising means for determining whether the large-capacity memory is connected to said apparatus, wherein said control means performs its control when said determining means determines that the large-capacity memory is not connected to said apparatus, and controls the large-capacity memory to store the one-page bit image data when said determining means determines that the large-capacity memory is connected to said apparatus.

28. An apparatus according to claim 27, wherein recovery processing of said recording means is not performed during recording of the one-page bit image data when the bit image data from the large-capacity memory is to be recorded.

29. An apparatus according to claim 27, wherein the large-capacity memory comprises an extended RAM.

30. An apparatus according to claim 26, wherein said control means further comprises an address management device for updating each partial area.

31. An apparatus according to claim 26, wherein said recording means ejects an ink droplet from an opening by means of heat energy, thereby recording the image.

32. An apparatus according to claim 31, wherein said recording means is capable of recording a full-color image.

33. An apparatus according to claim 26, wherein recording is performed by ejecting an ink droplet by means of air flow.

34. The recording apparatus according to claim 26, wherein said first memory means comprises a reception buffer.

35. The recording apparatus according to claim 26, wherein said second memory means comprises a reception buffer.

36. A recording method comprising the steps of:

inputting and storing in a first memory a page description language representing one page of image data to be recorded;

generating and storing in a second memory bit image data of a partial area smaller than one page; and repeatedly performing recording in units of partial areas until a one-page image is recorded, responsive to whether or not a large-capacity memory is connected.

37. A method according to claim 36, further comprising the steps of determining whether the large-capacity memory is connected, and storing the bit map image data of one page in the large-capacity memory when it is determined that the large-capacity memory is connected.

38. A method according to claim 36, wherein said method controls an address for updating the area.

39. A method according to claim 36, wherein the recording comprises ejecting an ink droplet from an opening by means of heat energy.

40. A method according to claim 39, wherein the step of performing recording comprises full-color recording.

41. A method according to claim 36, wherein the step of storing bit image data of the partial area comprises generating bit image data of one page and storing bit image data of the partial area of one page.

42. An apparatus according to claim 36, wherein recording is performed by ejecting an ink droplet by means of air flow.

43. The recording method of claim 36, wherein said first memory comprises a reception buffer.

44. The recording method of claim 36, wherein said second memory comprises a reception buffer.

45. A recording apparatus comprising:

first memory means for receiving and storing a page description language representing one page of image data to be recorded;

second memory means for storing bit image data, said second memory means having smaller than a one-page capacity;

means for recording the bit image data stored in said second memory means;

means for generating intermediate language on the basis of the page description language stored in said first memory means;

means for generating partial bit image data of an area corresponding to said second memory means on the basis of the generated intermediate language; and control means for repeatedly controlling said second memory means and said recording means until one page of bit image data is recorded such that the partial bit image data generated by said generating means is stored in said second memory means, and such that the partial bit image data stored in said second memory means is recorded by said recording means.

46. An apparatus according to claim 45, wherein the intermediate language is represented by coordinate data.

47. An apparatus according to claim 45, wherein said control means includes an address management device for updating each partial area.

48. An apparatus according to claim 45, wherein said recording means ejects an ink droplet from an opening by means of heat energy, thereby recording the image.

49. An apparatus according to claim 48, wherein recovery processing of said recording means is performed until the next partial bit image data is recorded after the current partial bit image data is recorded.

50. An apparatus according to claim 45, wherein said recording means records a full-color image.

51. An apparatus according to claim 45, wherein said generating means generates the one-page bit image data, but bit image data of unnecessary areas are not stored in said memory means.

52. An apparatus according to claim 45, wherein recording is performed by ejecting an ink droplet by means of air flow.

53. The recording apparatus of claim 45, wherein said first memory means comprises a reception buffer.

54. The recording apparatus of claim 45, wherein said second memory means comprises a reception buffer.

55. A recording method comprising the steps of:
receiving and storing in first memory means a page description language representing one page of image data to be recorded;
storing bit image data in second memory means having smaller than a one-page capacity;
recording the bit image data stored in the second memory means;
generating intermediate language on the basis of the page description language stored in the first memory means;
generating partial bit image data of an area corresponding to the second memory means on the basis of the generated intermediate language; and
repeatedly controlling the second memory means and a recording means until one page of bit image data is recorded such that the generated partial bit image data is stored in the second memory means, and such that the partial bit image data stored in the second memory means is recorded.

56. A method according to claim 55, wherein the intermediate language is represented by coordinated data.

57. A method according to claim 55, wherein said controlling step is performed using an address management device for updating each partial area.

58. A method according to claim 55, wherein the recording means ejects an ink droplet from an opening by means of heat energy, thereby recording the image.

59. A method according to claim 58, wherein a recovery process of the recording means is performed until the next partial bit image data is recorded.

60. A method according to claim 55, wherein the recording means records a full-color image.

61. A method according to claim 55, wherein, in said generating step the one-page bit image data is generated, but bit image data of unnecessary areas are not stored in the memory means.

62. An apparatus according to claim 55, wherein recording is performed by ejecting an ink droplet by means of air flow.

63. The recording method according to claim 55, wherein said first memory means comprises a reception buffer.

64. The recording method according to claim 55, wherein said second memory means comprises a reception buffer.

65. A recording apparatus comprising:
first memory means for inputting and storing control information representing one page of image data to be recorded;
means for generating and storing in second memory means, on the basis of the control information stored in said first memory means, bit image data of a partial area smaller than an output area designated by the stored control information; and
means for repeatedly performing recording in units of partial areas until an image of the designated output area is recorded, wherein the recording comprises ejecting an ink droplet from an opening by means of heat energy and wherein a recovery process for high quality recording is executed during the recording of the image of the designated output area.

66. An apparatus according to claim 65, wherein an address updating the partial area is controlled.

67. An apparatus according to claim 65, wherein said recording means comprises means for performing full-color recording.

68. An apparatus according to claim 65, wherein said generating and storing means generates bit image data of one page and stores bit image data of the partial area of one page.

69. An apparatus according to claim 65, further comprising means for performing recovery processing of said recording means until the next partial bit image data is recorded after the current partial bit image data is recorded.

70. An apparatus according to claim 65, wherein the control information input by said inputting means comprises a page description language.

71. The recording apparatus of claim 65, wherein said first memory means comprises a reception buffer.

72. The recording apparatus of claim 65, wherein said second memory means comprises a reception buffer.

73. A recording method comprising the steps of:
inputting add storing in a first memory control information representing one page of image data to be recorded;
generating and storing in a second memory, on the basis of the control information stored in the first memory, bit image data of a partial area smaller than an output area designated by the control information stored in the first memory; and
outputting data on the basis of the bit image data stored in the second memory by ejecting an ink droplet from an opening by means of heat energy, wherein a recovery process for high quality recording is executed during the recording of the image of the designated output area.

74. A method according to claim 73, wherein said outputting step comprises repeatedly recording in units of partial areas until a one-page image is recorded.

75. A method according to claim 73, wherein the control information input in said inputting step comprises a page description language.

76. A method according to claim 73, wherein said method controls an address for updating said area.

77. A method according to claim 73, wherein, in said step of performing recording, full-color recording is performed.

78. A method according to claim 73, wherein, in said generating and storing steps, bit image data of one page is generated and bit image data of the partial area of one page is stored.

79. A method according to claim 73, further comprising the step of performing recovery processing of a recording unit until the next partial bit image data is recorded after the current partial bit image data is recorded.

80. The recording method according to claim 73, wherein said first memory comprises a reception buffer.

81. The recording method according to claim 73, wherein said second memory comprises a reception buffer.

82. A recording apparatus comprising:

first memory means for inputting and storing control information representing one page of image data to be recorded;

means for generating and storing in second memory means, on the basis of the control information stored in said first memory means, bit image data of a partial area smaller than an output area designated by the control information stored in said first memory means; and means for outputting data on the basis of the bit image data stored in the second memory means by ejecting an ink droplet from an opening by means of heat energy, wherein a recovery process for high quality recording is executed during the recording of the image of the designated output area.

83. An apparatus according to claim 82, wherein said outputting means repeatedly records in units of partial areas until a one-page image is recorded.

84. An apparatus according to claim 82, wherein the control information input by said inputting means comprises a page description language.

85. An apparatus according to claim 82, wherein an address for updating the partial area is controlled.

86. An apparatus according to claim 82, wherein said means for performing recording, performs full-color recording.

87. An apparatus according to claim 82, wherein said means for generating and storing, generates bit image data of one page and stores bit image data of the partial area of one page.

88. An apparatus according to claim 82, further comprising means for performing recovery processing of said recording means until the next partial bit image data is recorded after the current partial bit image data is recorded.

89. The recording apparatus of claim 82, wherein said first memory means comprises a reception buffer.

90. The recording apparatus of claim 82, wherein said second memory means comprises a reception buffer.

91. A recording method comprising the steps of:

inputting and storing in a first memory control information representing one page of image data to be recorded;

generating and storing in a second memory, on the basis of the control information stored in the first memory, bit image data of a partial area smaller than an output area designated by the control information stored in the first memory; and recording data on the basis of the bit image data stored in the second memory in color.

92. A method according to claim 91, wherein said recording step further comprises repeatedly recording in units of partial areas until a one-page image is recorded.

93. A method according to claim 91, wherein the control information input in said inputting step comprises a page description language.

94. A method according to claim 91, wherein said method controls an address for updating the partial area.

95. A method according to claim 91, wherein, in said recording step, an ink droplet is ejected from an opening by means of heat energy.

96. A method according to claim 91, wherein, in said step of performing recording, full-color recording is performed.

97. A method according to claim 91, wherein, in said generating and storing step, bit image data of one page is generated and bit image data of the partial area of one page stored.

98. A method according to claim 91, further comprising the step of performing recovering processing of a recording unit until the next partial bit image data is recorded after the current partial bit image data is recorded.

99. An apparatus according to claim 91, wherein recording is performed by ejecting an ink droplet by means of air flow.

100. The recording method of claim 91, wherein said first memory comprises a reception buffer.

101. The recording method of claim 91, wherein said second memory means comprises a reception buffer.

102. A recording apparatus comprising:

first memory means for inputting and storing control information representing one page of image data to be recorded;

means for generating and storing in second memory means, on the basis of the control information stored in said first memory, bit image data of a partial area smaller than an output area designated by the control information stored in said first memory means; and means for recording data on the basis of the bit image data stored in the second memory means in color.

103. An apparatus according to claim 102, wherein said recording means repeatedly records in units of partial areas until a one-page image is recorded.

104. An apparatus according to claim 102, wherein the control information input by said inputting means comprises a page description language.

105. An apparatus according to claim 102, wherein an address for updating the partial area.

106. An apparatus according to claim 102, wherein said recording means records by ejecting an ink droplet from an opening by means of heat energy.

107. An apparatus according to claim 102, wherein said means for recording, performs full-color recording.

108. An apparatus according to claim 102, wherein said generating and storing means generates bit image data of one page and stores bit image data of the partial area of one page.

109. An apparatus according to claim 102, further comprising means for performing recovering processing of said recording means until the next partial bit image data is recorded after the current partial bit image data is recorded.

110. The recording apparatus according to claim 102, wherein said first memory means comprises a reception buffer.

111. The recording apparatus according to claim 102, wherein said second memory means comprises a reception buffer.

112. A printing apparatus comprising:

first memory means for receiving and storing control information representing image data to be printed;

discriminating means for discriminating whether a detachable memory is connected to said printing apparatus;

setting means for setting the size of a second memory means which stores bit image data as a one-page size or a partial size smaller than one page in response to a discrimination by said discriminating means; and print means for printing data in color on the basis of the bit image data stored in the second memory means.

113. An apparatus according to claim 112, wherein the control information comprises a page description language.

114. An apparatus according to claim 112, wherein if said discriminating means discriminates that the detachable memory is connected to said apparatus, said setting means sets the size of the second memory means as the one-page size.

115. An apparatus according to claim 112, wherein if said discriminating means discriminates that the detachable memory is not connected to said apparatus, said setting means sets the size of the second memory means as the partial size.

116. A printing apparatus comprising:

first memory means for receiving and storing control information representing image data to be printed;

discriminating means for discriminating whether a detachable memory is connected to said printing apparatus;

setting means for setting the size of a second memory means which stores bit image data as a one-page size or a partial size smaller than one page in response to a discrimination by said discriminating means; and print means for printing data on the basis of the bit image data stored in the second memory by ejecting an ink droplet from an opening by means of heat energy, wherein a recovery process for high quality recording can be executed during a printing operation by said print means.

117. An apparatus according to claim 116, wherein the control information comprises a page description language.

118. An apparatus according to claim 116, wherein if said discriminating means discriminates that the detachable memory is connected to said apparatus, said setting means sets the size of the second memory means as the one-page size.

119. An apparatus according to claim 116, wherein if said discriminating means discriminates that the detachable memory is not connected to said apparatus, said setting means sets the size of the second memory means as the partial size.

120. A method of operating a printing apparatus comprising the steps of:

receiving and storing in a first memory control information representing image data to be printed;

discriminating by a discriminator whether a detachable memory is connected to said printing apparatus;

setting the size of a second memory which stores bit image data as a one-page size or a partial size smaller than one page in response to a discrimination by said discriminator; and printing data in color on the basis of the bit image data stored in the second memory.

121. A method according to claim 120, wherein the control information comprises a page description language.

122. A method according to claim 120, wherein in said discriminating step if said discriminator discriminates that the detachable memory is connected to said apparatus, the size of the second memory is set in said setting step as the one-page size.

123. A method according to claim 120, wherein in said discriminating step if said discriminator discriminates that the detachable memory is not connected to said apparatus, the size of the second memory means is set in said setting step as the partial size.

124. A method of operating a printing apparatus comprising the steps of:

receiving and storing in a first memory control information representing image data to be printed;

discriminating by a discriminator whether a detachable memory is connected to said printing apparatus;

setting the size of a second memory which stores bit image data as a one-page size or a partial size smaller than one page in response to a discrimination by said discriminator; and printing data by a printer on the basis of the bit image data stored in the second memory by ejecting an ink droplet from an opening by means of heat energy, wherein a recovery process for high quality recording can be executed during a printing operation by said printer.

125. A method according to claim 124, wherein the control information comprises a page description language.

126. A method according to claim 124, wherein in said discriminating step if said discriminator discriminates that the detachable memory is connected to said apparatus, the size of the second memory is set in said setting step as the one-page size.

127. A method according to claim 124, wherein in said discriminating step if said discriminator discriminates that the detachable memory is not connected to said apparatus, the size of the second memory is set in said setting step as the partial size.

* * * * *

UNITED STATES PATENT AND TRADEMARK OFFICE
CERTIFICATE OF CORRECTION

PATENT NO. : 5,471,322

DATED : November 28, 1995

INVENTOR : DAISUKE MURATA

It is certified that errors appear in the above-identified patent and that said Letters Patent is hereby corrected as shown below:

COLUMN 1

Line 45, "(1) and (2) respectively" should read --(1)--; and

Line 46, "(1) and (2) respectively" should read --(2)--.

COLUMN 3

Line 33, "above, the" should read --above, in the--.

COLUMN 6

Line 25, "injec-" should read --ejec- --.

COLUMN 11

Line 4, "in each" should read --in which each--; and

Line 27, "comprise" should read --comprises--.

COLUMN 12

Line 9, "start; position" should read --start position--;

Line 14, "the-next" should read --the next--;

Line 37, "embodiment: will" should read --embodiment will--; and

Line 41, "CPU 01" should read --CPU 201--.

UNITED STATES PATENT AND TRADEMARK OFFICE
CERTIFICATE OF CORRECTION

PATENT NO. : 5,471,322

DATED : November 28, 1995

INVENTOR : DAISUKE MURATA

It is certified that errors appear in the above-identified patent and that said Letters Patent is hereby corrected as shown below:

COLUMN 13

Line 33, "injection" should read --ejection--;

Line 40, "and" should be deleted.

COLUMN 14

Line 32, "in first" should read --in the first--; and

Line 44, "said" should read --the--.

COLUMN 17

Line 57, "recorded." should read --recorded after the current partial bit image data is recorded.--; and Line 61, "step" should read --step,--.

Column 14, line 32, "the" should read --said--.

UNITED STATES PATENT AND TRADEMARK OFFICE
CERTIFICATE OF CORRECTION

PATENT NO. : 5,471,322

DATED : November 28, 1995

INVENTOR : DAISUKE MURATA

It is certified that errors appear in the above-identified patent and that said Letters Patent is hereby corrected as shown below:

<u>COLUMN 20</u>

Line 10, "stored." should read --is stored.--.

Signed and Sealed this

Thirtieth Day of April, 1996

*Attest:*

BRUCE LEHMAN

*Attesting Officer*     *Commissioner of Patents and Trademarks*